US 6,693,621 B1

(12) United States Patent
Hayakawa et al.

(10) Patent No.: US 6,693,621 B1
(45) Date of Patent: Feb. 17, 2004

(54) ELECTROPHORETIC DISPLAY METHOD, DISPLAY MEDIUM, LIQUID AND PARTICLE FOR DISPLAY MEDIUM, DISPLAY APPARATUS, AND REVERSIBLE DISPLAY MATERIAL

(75) Inventors: Kunio Hayakawa, Shizuoka (JP);
Shigeyuki Harada, Shizuoka (JP);
Mitsunobu Morita, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 434 days.

(21) Appl. No.: 09/694,000

(22) Filed: Oct. 23, 2000

(30) Foreign Application Priority Data

Oct. 22, 1999 (JP) .............................. 11-301114
Sep. 11, 2000 (JP) ........................ 2000-275412

(51) Int. Cl.⁷ ................................. G09G 3/34
(52) U.S. Cl. ........................ 345/107; 359/296
(58) Field of Search ............ 345/107, 48, 84; 349/86; 359/296, 297

(56) References Cited

U.S. PATENT DOCUMENTS 6,323,989 B1 * 11/2001 Jacobson et al.
6,333,754 B1 * 12/2001 Oba et al.
6,400,492 B1 * 6/2002 Morita et al.

FOREIGN PATENT DOCUMENTS

| JP | 62-269124 | * 11/1987 |
| JP | 63-50886 | 3/1988 |
| JP | 2551783 | 11/1996 |
| JP | 8-510790 | * 11/1996 |
| JP | 10-149117 | * 6/1998 |
| WO | 98/03896 | * 1/1998 |

* cited by examiner

*Primary Examiner*—Regina Liang
(74) *Attorney, Agent, or Firm*—Oblon, Spivak, McClelland, Maier & Neustadt, P.C.

(57) ABSTRACT

An electrophoretic display method, using a display dispersion system which includes a dispersion medium, at least one electrophoretically movable coloring material (A) of coloring particles, and at least one electrophoretically immovable coloring material (B) of coloring particles, each of the coloring materials (A) and (B) having a different color tone and being dispersed in the dispersion medium, including the step of selectively causing the coloring material (A) to electrophoretically migrate through the dispersion medium in a predetermined direction in response to an electric field externally applied thereto, while causing the electrophoretically immovable coloring material (B) to stay in the dispersion medium. An electrophoretic display apparatus is provided with the display medium and a recording unit.

43 Claims, 4 Drawing Sheets

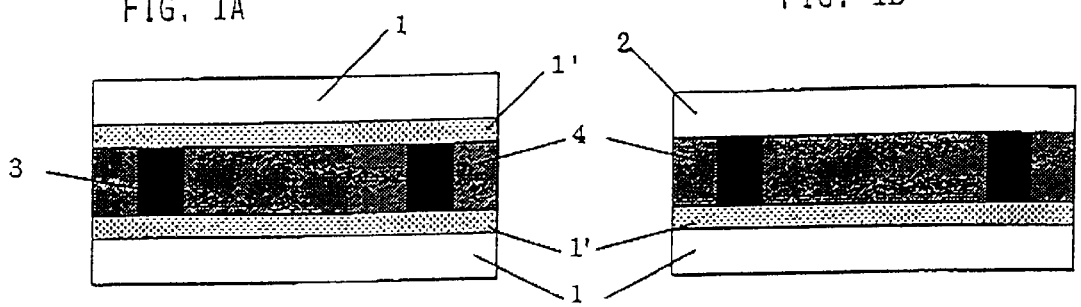
FIG. 1A
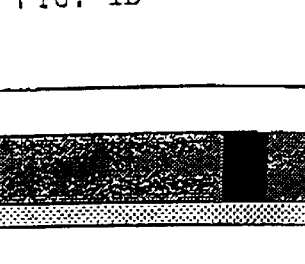
FIG. 1B
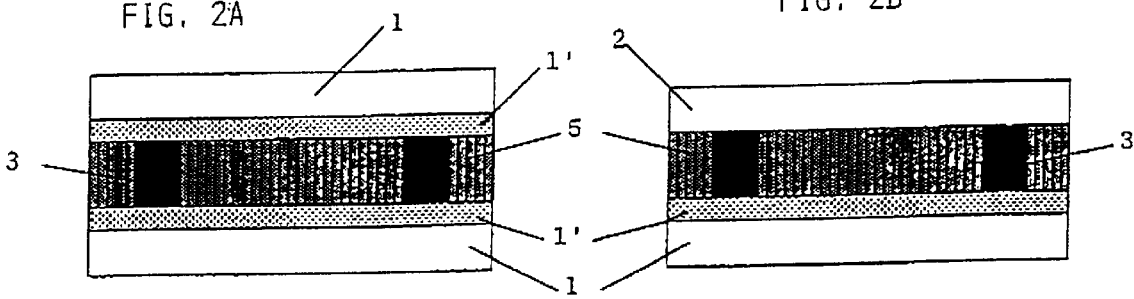
FIG. 2A
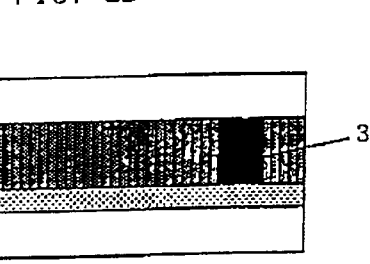
FIG. 2B
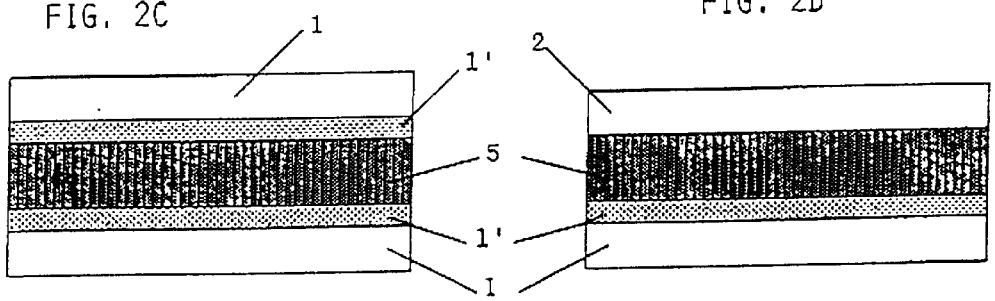
FIG. 2C
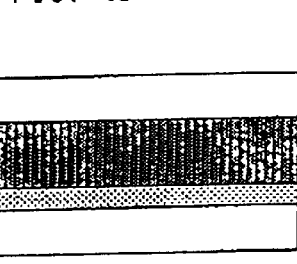
FIG. 2D
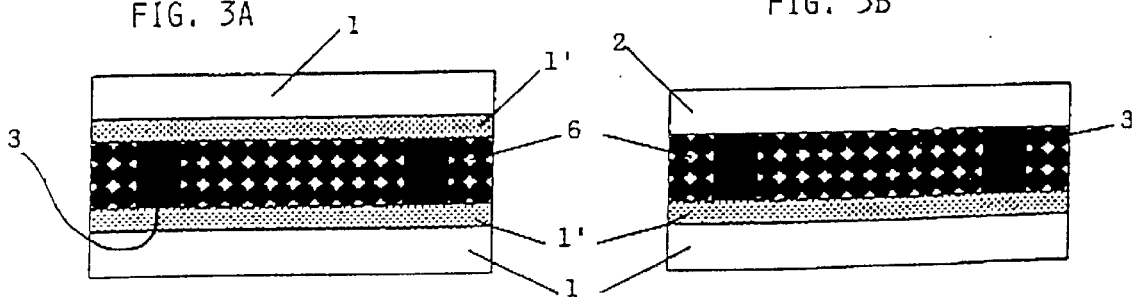
FIG. 3A
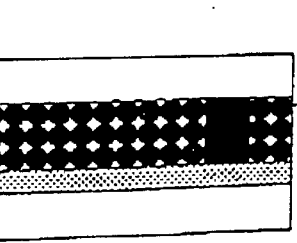
FIG. 3B
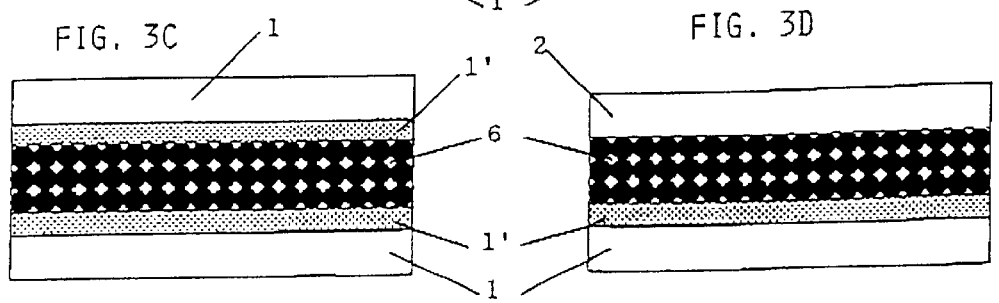
FIG. 3C
FIG. 3D

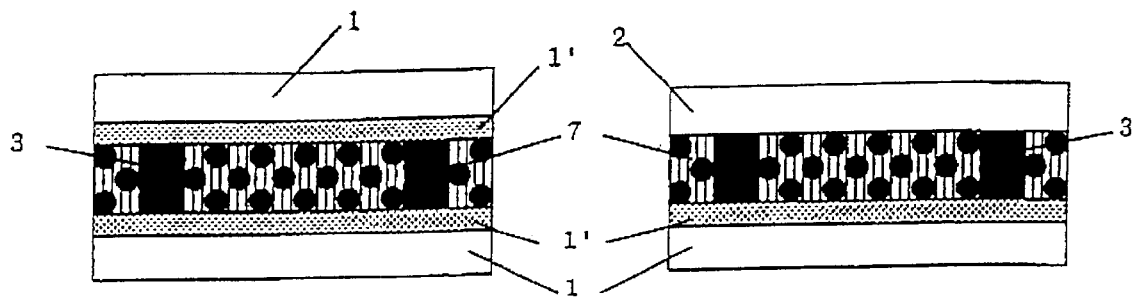
FIG. 4A  FIG. 4B
FIG. 4C  FIG. 4D
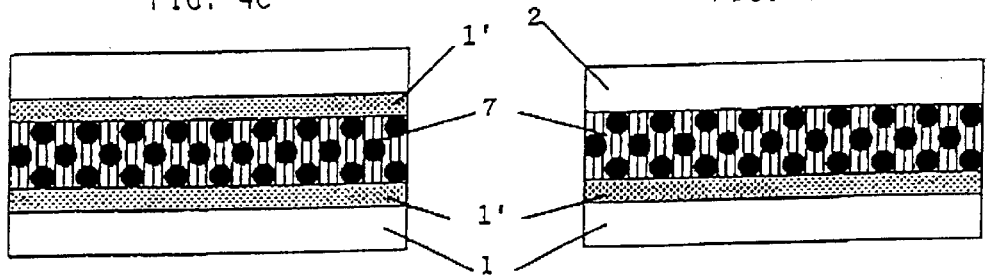
FIG. 5A  FIG. 5B
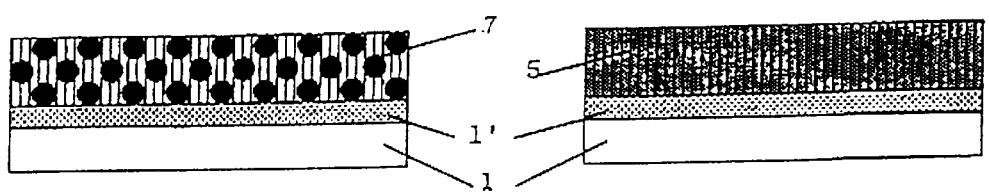
FIG. 6A  FIG. 6B
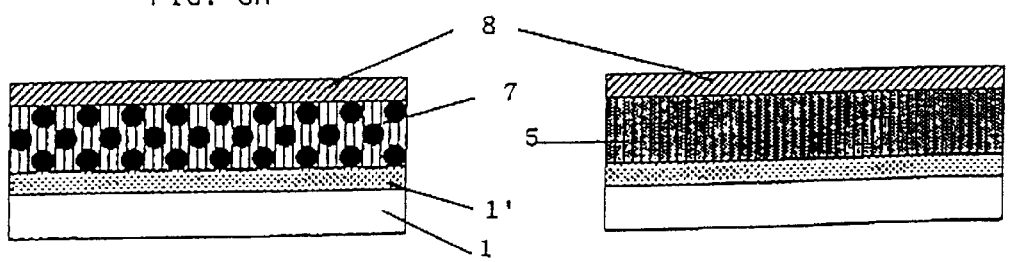

ELECTROPHORETIC DISPLAY METHOD, DISPLAY MEDIUM, LIQUID AND PARTICLE FOR DISPLAY MEDIUM, DISPLAY APPARATUS, AND REVERSIBLE DISPLAY MATERIAL

BACKGROUND OF THE INVENTION

1. Field of the Invention

The present invention relates to an electrophoretic display method capable of reversibly changing a display between the visually recognizable states by the action of an electric field or the like. The present invention also relates to an electrophoretic display liquid and display particles for use in the above-mentioned electrophoretic display method, an electrophoretic display medium for use with the above-mentioned electrophoretic display method, and further an electrophoretic display apparatus and reversible display material using the display medium.

2. Discussion of Background

The display apparatus using electrophoretic migration is constructed in such a configuration that two substrates, at least one substrate being made transparent, are disposed opposite via spacers to have a predetermined enclosed space therebetween. A display liquid is held in the enclosed space between the substrates to provide a display panel. The conventional display liquid comprises a dispersion medium and a pigment powder dispersed therein, the dispersion medium assuming a color different from that of the pigment powder. By the application of an electric field to the display panel, visual display can be observed through the transparent substrate serving as a display surface.

In the above-mentioned case, more specifically, the display liquid for use in the electrophoretic migration display method comprises a dispersion medium such as xylene or isoparaffin, a dispersed powder such as titanium dioxide, a dye for providing the dispersion medium with a different color from the color of the dispersed powder, a dispersant such as a surfactant, and an additive component such as a charge imparting agent.

By the application of an electric field to the above-mentioned display liquid, the dispersed powder in the liquid migrates to the transparent substrate side, so that a color of the dispersed particle can be recognized through the transparent substrate.

When the applied electric field is reversed, the dispersed powder migrates toward the other substrate, so that a color of the dispersion medium, which is colored with a dye, can be visually recognized through the transparent substrate.

The electrophoretic migration type display apparatus can provide a predetermined display by controlling the polarity of the applied electric field, as previously explained. Special attention has been paid to the electrophoretic migration type display apparatus because of the following advantages:

(1) The display apparatus is inexpensive since a display liquid for use in the apparatus is relatively easily available.
(2) The angle of field of the display apparatus is as wide as that of general printed matter.
(3) The consumption power can be reduced.
(4) The display apparatus has memory characteristics.

A display apparatus using electrophoretic migration is disclosed in Japanese Laid-Open Patent Application 1-86116, which is constructed in such a manner that a display liquid comprising a dispersed powder and a dispersion medium dyed with a color different from the color of the dispersed powder is enclosed in microcapsules, and the microcapsules are arranged between a pair of electrodes. This application is issued as Japanese Patent No. 2551783 in 1996. The electrophoretic display apparatus can be thus achieved by employing a simple structure.

In the display liquid for use in the conventional electrophoretic display apparatus, an inorganic pigment with a high refractive index, for example, titanium oxide powder, is dispersed in a dispersion medium in which a dye is dissolved for coloring the dispersion medium. However, when the color of the inorganic pigment powder is displayed, the color or the pigment powder is readily mixed with the color or the dispersion medium, thereby drastically lowering the contrast of display.

This problem is considered to result from adsorption of a dye for use in the display medium by the surfaces of the pigment particles, and permeation of the dye solution through the gap between the pigment particles. This problem is unavoidable for the electrophoretic display apparatus where a colored dispersion medium is employed for the display liquid.

The above-mentioned problem becomes noticeable when a white pigment is used as the dispersed powder. The degree of whiteness of a background portion in display, that is, a non-recorded portion, is considerably decreased, which may result in a fatal defect for the display medium.

To solve the above-mentioned problem, the following proposals are made: (a) to use a dye which is not readily adsorbed by the surfaces of pigment particles as a coloring agent for a dispersion medium (Philips Lab: Conference Record of 1980 Biennial Disp. Res. Conf.); (b) to decrease the concentration of a dye in a dispersion medium (Xerox PaloAlto: Proc. SID, Vol. 18, 3/4, 1977); and (c) to optimize the concentration of a dye, the concentration of a pigment, and the content of a surfactant (Matsushita: Proc. SID, Vol. 18, No. 3/4, 1977).

However, the above-mentioned proposals cannot produce sufficient effects in practice. To make matters worse, the density of a displayed image and the response speed are decreased.

As mentioned above, Japanese Patent No. 2551783 discloses a display method using display particles which are prepared by enclosing an electrophoretic display liquid in microcapsules. One of the advantages obtained by this electrophoretic display method is that the problem of uneven display as caused by non-uniform distribution of electrophoretic particles can be inhabited. However, even when the above-mentioned display method is adopted, the pigment powder tends to be colored by a dye solution, thereby lowering the display contrast because each microcapsule contains therein a dye solution and a dispersion of a pigment powder.

An electrophoretic display system using no dye solution is proposed in order to eliminate the above-mentioned shortcoming resulting from the dispersion medium colored with a dye.

For instance, Japanese Laid-Open Patent Application No. 62-269124 discloses an electrophoretic migration type display element constructed in such a manner that opposite electrodes, at least one of which is transparent, are superimposed via spacers to provide a cell therebetween, and a display liquid is enclosed in the cell. The display liquid comprises a colorless dispersion medium which has high electrical insulating properties and low viscosity, and at least two kinds of electrophoretic migration powders dispersed in the dispersion medium, those electrophoretic powders being different in color and polarity for electrophoretic migration.

However, there is a risk that the above-mentioned two kinds of electrophoretic migration powders with different colors tend to aggregate by electrical attraction because the two kinds of powders are charged to opposite polarities. Consequently, color mixing occurs, and it becomes difficult to achieve a display with high contrast.

According to Japanese Laid-Open Patent Application 63-50886, at least two kinds of electrophoretic migration powders are dispersed in a colorless dispersion medium which has high electrical insulating properties and low viscosity, thereby preparing a display liquid. The display liquid is held in the cell in the same manner as in the above, so that an electrophoretic migration type display element is provided. In this case, however, the two electrophoretic migration powders show the same polarity, but are different in color tone and electrophoretic velocity.

In this case, image display is attained on the ground of the difference in migration velocity of the electrophoretic migration powders with different colors. Those powders have inclinations to migrate in the same direction, so that it is impossible to simultaneously display two different colors on the identical display surface. This image display method is therefore considered to be impractical.

Further, WO98/03896 discloses an embodiment where the same dispersion system as in the aforementioned Japanese Laid-Open Patent Application No. 62-269124 is enclosed in microcapsules. In this case, the two kinds of electrophoretic migration powders are electrically attracted to each other, so that the powders tend to aggregate. Namely, the color mixing problem occurs in each microcapsule. The preparation of the microcapsules is impractical in this case.

To prevent such aggregation of the two kinds of electrophoretic powders which are different in color and electrical charge for use in the display liquid, the addition of a charge control agent to the display liquid and surface treatment of the powders are proposed in Published Japanese Translation (No. 8-510790) of PCT international publication for patent application. However, the electrophoretic powders with opposite electric charges to migrate in opposite directions cannot be completely prevented from being aggregated. High contrast has not yet been obtained in such a display element of electrophoretic type.

An ink composition for image display is disclosed in Japanese Laid-Open Patent Application 10-149117, which comprises a concealing white powder comprising a resin and a white pigment, a coloring powder for image display, and a solvent.

In the above application, the white powder is a composite material prepared by subjecting a mixture of a white pigment and a resin to polymerization and aggregation after kneading, pulverizing, and dispersing steps. This type of white powder is employed in the display liquid because the specific gravity of the white powder is different from that of the dispersion medium colored with a dye. The white powder is not provided with a function of preventing the two kinds of powders from being aggregated when the white powder is used in combination with another coloring powder, that is, a magnetic powder or a mixture comprising the magnetic powder. The result is that there also occurs the above-mentioned problem of color mixing, and the contrast is lowered in the obtained display.

SUMMARY OF THE INVENTION

Accordingly, a first object of the present invention is to provide an electrophoretic display method using a display dispersion system comprising a dispersion medium and at least two kinds of electrophoretic migration powders with different colors, capable of achieving a display with high contrast.

A second object of the present invention is to provide an electrophoretic display liquid for use with the above-mentioned electrophoretic display method.

A third object of the present invention is to provide electrophoretic particles for use with the above-mentioned electrophoretic display method.

A fourth object of the present invention is to provide an electrophoretic display medium using the above-mentioned electrophoretic display liquid and display particles.

A fifth object of the present invention is to provide a display apparatus using the above-mentioned electrophoretic display medium.

A sixth object of the present invention is to provide a reversible display material using the above-mentioned electrophoretic display medium.

The previously mentioned first object of the present invention can be achieved by an electrophoretic display method, using a display dispersion system, the display dispersion system comprising a dispersion medium, at least one electrophoretically movable coloring material (A) comprising coloring particles, and at least one electrophoretically immovable coloring material (B) comprising coloring particles, each of the coloring materials (A) and (B) having a different color tone and being dispersed in the dispersion medium, comprising the step of selectively causing the coloring material (A) to electrophoretically migrate through the dispersion medium in a predetermined direction in response to an electric field externally applied thereto, while causing the electrophoretically immovable coloring material (B) to stay in the dispersion medium.

The second object of the present invention can be achieved by an electrophoretic display liquid for use with an electrophoretic display method, comprising a dispersion medium, at least one electrophoretically movable coloring material (A) comprising coloring particles, and at least one electrophoretically immovable coloring material (B) comprising coloring particles, each of the coloring materials (A) and (B) having a different color tone and being dispersed in the dispersion medium, the coloring material (A) being selectively caused to electrophoretically migrate through the dispersion medium in a predetermined direction in response to an electric field externally applied thereto, while the electrophoretically immovable coloring material (B) being caused to stay in the dispersion medium.

The third object of the present invention can be achieved by electrophoretic display particles comprising microcapsules which contain the above-mentioned electrophoretic display liquid therein.

The fourth object of the present invention can be achieved by an electrophoretic display medium comprising (i) a pair of substrates, at least one of the substrates being transparent and provided with an electrode, the substrates being disposed to face each other via spacers or not, to have an enclosed space therebetween in such a configuration that the electrode surface of one substrate faces the other substrate, and (ii) the above-mentioned electrophoretic display liquid held in the enclosed space between the substrates.

The electrophoretic display medium may be prepared in such a configuration that the enclosed space is partitioned by a matrix material which holds the display liquid therein.

Further, in the electrophoretic display medium, the above-mentioned electrophoretic display particles may be held in the enclosed space between the substrates. In this case, the enclosed space may be partitioned by a matrix material which holds the electrophoretic display particles therein.

Furthermore, the fourth object can also be achieved by an electrophoretic display medium comprising (i) a substrate having a surface provided with an electrode, and (ii) a recording layer provided on the electrode surface of the substrate, the recording layer comprising a matrix material and the above-mentioned electrophoretic display liquid or electrophoretic display particles.

The fifth object of the present invention can be achieved by an electrophoretic display apparatus comprising the above-mentioned electrophoretic display medium and a recording unit capable of displaying a visible information on the display medium, the recording unit coming in contact with the display medium at least in recording operation. The recording unit comprises an electrode array which can apply an electric field to the display medium according to image signals and shift the relative position on the same plane with respect to the display medium.

The recording unit for use in the electrophoretic display apparatus may comprise an ion beam array which can impart electric charges to the display medium according to image signals and shift the relative position on the same plane with respect to the display medium.

In addition, the recording unit for use in the electrophoretic display apparatus may comprise a plurality of signal electrodes and a plurality of scanning electrodes, each of the intersecting points of the signal electrodes and the scanning electrodes having a switching element capable of applying an electric field to the display medium according to image signals.

The sixth object of the present invention can be achieved by a reversible display material comprising the above-mentioned electrophoretic display medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A and FIG. 1B are schematic cross-sectional views, showing a first embodiment of the electrophoretic display medium according to the present invention.

FIG. 2A to FIG. 2D are schematic cross-sectional views, showing a second embodiment of the electrophoretic display medium according to the present invention.

FIG. 3A to FIG. 3D are schematic cross-sectional views, showing a third embodiment of the electrophoretic display medium according to the present invention.

FIG. 4A to FIG. 4D are schematic cross-sectional views, showing a fourth embodiment of the electrophoretic display medium according to the present invention.

FIG. 5A and FIG. 5B are schematic cross-sectional views, showing a fifth embodiment of the electrophoretic display medium according to the present invention.

FIG. 6A and FIG. 6B are schematic cross-sectional views, showing a sixth embodiment of the electrophoretic display medium according to the present invention.

DESCRIPTION OF THE PREFERRED EMBODIMENTS

Figure 7:
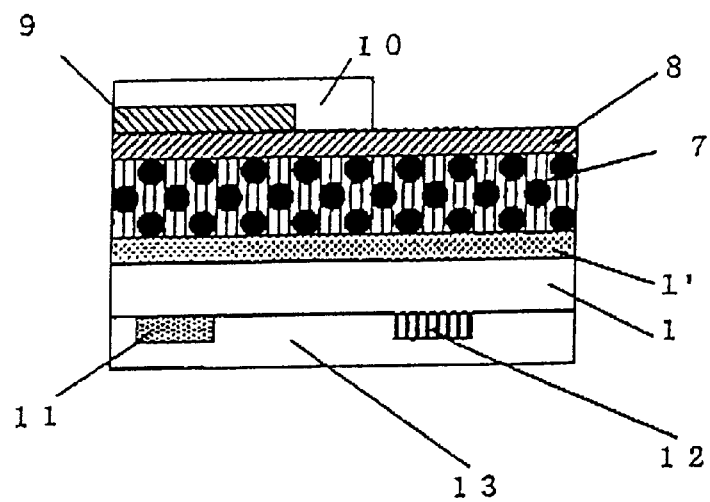
FIG. 7 is a schematic cross-sectional view showing a seventh embodiment of the electrophoretic display medium according to the present invention.

In the phenomenon known as "electrophoresis", the migrating velocity (v) of a fine particle dispersed in a dispersion medium is usually expressed in the following Huckel's equation:

$$v = \frac{\varepsilon \xi E}{6\pi \eta}$$

wherein $\varepsilon$ is the dielectric constant of the dispersion medium, $\zeta$ is the zeta-potential, E is the electric field, and $\eta$ is the viscosity (cp) of the dispersion.

In this case, the moving direction of the fine particle in the dispersion medium is determined by the polarity of the electric charge given to the fine particle. For instance, in the case where a dispersion using the above-mentioned electrophoretic phenomenon (hereinafter referred to as "an electrophoretic dispersion" or simply "a dispersion") is enclosed in a space interposed between a positive polarity, and a negative polarity, fine particles in the dispersion migrate to and deposit upon the negative polarity when the particles are positively charged, while the particles migrate to and deposit upon the positive polarity when they are negatively charged.

Some methods for measuring the migrating velocities of electrophoretic fine particles in the dispersion medium are conventionally known, for example, moving-boundary method, microscopic electrophoretic method, Henry method, and zone electrophoretic method.

In most cases, fine particles, when dispersed in a dispersion medium, are electrically charged to some extent. Therefore, the moving velocity of the fine particles in the dispersion medium can be obtained by the above-mentioned equation. However, when the moving velocity of fine particles is an extremely small value, that is, substantially close to zero, the fine particles can be considered to conduct no electrophoretic migration in the dispersion medium in practice.

According to the electrophoretic display method, display liquid, and display particles of the present invention, at least one electrophoretically movable coloring material (A) comprising coloring particles (hereinafter referred to as a coloring powder (A), and at least one electrophoretically immovable coloring material (B) comprising coloring particles (hereinafter referred to as a coloring powder (B) are dispersed in a dispersion medium, the coloring powder (A) and the coloring powder (B) being different in color tone. When one kind of coloring powder (A) and one kind of coloring powder (B) are employed, the moving velocities of the coloring powders (A) and (B) in the same dispersion medium depend upon the intensity of the respective electric charges.

In the case where the electric charge of the coloring powder (B) is extremely small, and consequently the moving velocity thereof is substantially close to zero, the coloring powder (B) can be regarded as a powder not conducting electrophoretic migration. The coloring powder (B) is immovable in the dispersion medium although the electric field is applied thereto.

On the other hand, when the coloring powder (A) acquires electric charges to a certain extent, the powder (A) moves through a dispersion medium at a velocity corresponding to the electric charges. The coloring powder (A) moves and passes through the coloring powder (B) which stays still in the dispersion medium under the influence of an electric field. The result is that the coloring powder (A) is separated from the coloring powder (B) in the dispersion medium. Since the coloring powder (A) and the coloring powder (B) are different in color tone, there can be obtained a contrast in color.

It is particularly preferable to employ a white powder as the above-mentioned coloring powder (B) and a black powder as the coloring powder (A). In such a case, the black powder passes through the white powder under the influence of an electric field, and is finally separated from the white powder, whereby the black powder can make a contrast with the white powder.

The electrophoretic display method of the present invention employing a display dispersion system which comprises a dispersion medium, a coloring powder (A) and a coloring powder (B), powders (A) and (B) being different in color tone, is characterized in that the coloring powder (A) is selectively caused to electrophoretically migrate through the dispersion medium under the influence of an electric field externally applied thereto, while the coloring powder (B) is caused to stay in the dispersion medium.

Likewise, the electrophoretic display liquid of the present invention is characterized in that only the coloring powder (A) electrophoretically moves through the dispersion medium under the influence of an electric field. As a result, the separating performance of the coloring powder (A) from the coloring powder (B) is improved, so that the obtained contrast becomes satisfactory.

In contrast to this, one of the conventional electrophoretic display methods as disclosed in Japanese Laid-Open Patent Application 63-50886 has the drawback that the separating performance of two kinds of different coloring powders is too poor to obtain a satisfactory contrast. This is because the above-mentioned method employs two kinds of coloring powders that are electrically charged to the same polarity and different in color tone. More specifically, when an electric field is applied, the two coloring powders begin to migrate in the same direction at the same time at different moving velocities. When one coloring powder (a) of which moving velocity is lower than that of the other coloring powder (b) is present in a portion adjacent to the electrode, the coloring powder (a) will unfavorably deposit upon the electrode before the coloring powder (b) overtakes the coloring powder (a) under the influence of an electric field. Such a phenomenon lowers the separating performance of powders, and consequently decreases the contrast in color.

Japanese Laid-Open Patent Application 62-269124 discloses an electrophoretic display method using two kinds of powders that are different in color tone and electric charge. In this case, the charges of the two coloring powders are required to have almost the same intensity. Since the two coloring powders are oppositely charged to the same extent, there is a risk that these coloring powders are electrically attracted to each other to tend to aggregate. Owing to the aggregation of the two coloring powders, the two colors are mixed, resulting in the decrease in contrast.

In the electrophoretic display method, display liquid, and display particles according to the present invention, the presence or absence of the electrophoretic migrating properties of the coloring material comprising coloring particles in the dispersion medium under the influence of an electric field is determined by enclosing a dispersion of a coloring particles in a space between a pair of electrodes, and observing the distribution of the coloring particles between the electrodes after the application of a predetermined electric field. In the above, the electric field of about 10 kV/cm is applied to the dispersion. In other words, a pigment powder is considered to be provided with the electrophoretic properties when the pigment powder can move through the dispersion medium in response to the application of an electric field of about 10 kV/cm.

To be more specific, a pair of glass plates, each being coated with a transparent electrode film (ITO film) are disposed to face each other via spacers in such a configuration that a space is formed between the glass plates. A dispersion prepared by dispersing a coloring material comprising coloring particles in a dispersion medium is injected into the space, and the electrodes are fixed together with clips to obtain a measuring cell. A direct-current power supply is connected to the measuring cell to apply a voltage to the cell. Thereafter, the clips are removed and the glass plates are split to observe the condition of the dispersion at surface portions close to both glass plates. When the above-mentioned coloring material is provided with the electrophoretic migrating properties, the coloring particles are movable through the dispersion medium at a relatively large velocity under the influence of an electric field. The result is that the dispersion medium free of the dispersed coloring particles is observed at the surface portion adjacent to one glass plate, while the dispersion of the coloring particles can be observed at the surface portion adjacent to the other glass plate.

In contrast to the above, when the coloring material is not provided with the electrophoretic migrating properties, the moving velocity of the coloring particles is extremely small, that is, substantially zero. In this case, the dispersion or the coloring particles is observed at both surface portions adjacent to the glass plates.

As the coloring material comprising coloring particles for use in the electrophoretic display method, display liquid, and display particles, colorless or colored inorganic and organic pigment particles can be employed. The above-mentioned pigment particles for use in the present invention show low solubility in a dispersion medium to be employed, and can stay in the dispersion medium in the form of particles.

Further, the pigment particles may be colored or colorless as mentioned above. A white powder is considered to be one of the colored powders.

Specific examples of the inorganic pigment particles serving as the coloring powder for use in the present invention include white lead, zinc white, lithopone, titanium dioxide, zinc sulfide, antimony oxide, calcium carbonate, kaolin, mica, barium sulfate, gloss white, alumina white, talc, silica, calcium silicate, cadmium yellow, cadmium lithopone yellow, yellow iron oxide, titanium yellow, titanium barium yellow, cadmium orange, cadmium lithopone orange, molybdate orange, iron oxide red, red lead, vermillion, cadmium red, cadmium lithopone red, amber, brown iron oxide, iron zinc, chrome brown, chrome green, chromium oxide, viridian, cobalt green, cobalt chrome green, titanium cobalt green, iron blue, cobalt blue, ultramarine blue, cerulean blue, cobalt aluminum chrome blue, cobalt violet, mineral violet, carbon black, iron black, manganese ferrite black, cobalt ferrite black, copper chrome black, copper chrome imanganese black, titanium black, aluminum powder, copper powder, lead powder, tin powder, and zinc powder.

Specific examples of the organic pigment particles include fast yellow, disazo yellow, condensed azo yellow, anthrapyrimidine yellow, isoindolin yellow, copper azomethine yellow, cuinophthalone yellow, benzimidazolone yellow, nickel dioxine yellow, monoazo yellow lake, dinitroaniline orange, pyrazolone orange, perinone orange, naphthol red, toluidine red, permanent carmine, brilliant fast scarlet, pyrazolone red, rhodamine 6G lake, permanent red, lithol red, BON lake red, lake red, brilliant carmine, bordeaux 10B, quinacridone magenta, condensed azo red, naphthol carmine, perylene scarlet, condensed azo scarlet, benzimidazolone carmine, anthraquinonyl red, perylene red, perylene maroon, quinacridone maroon, quinacridone scarlet, quinacridone red, diketopyrrolopyrrole red, benzimidazolone brown, phthalocyanine green, victoria blue lake, phthalocyanine blue, fast sky blue, alkali blue toner, indanthrone blue, rhodamine B lake, methyl violet lake, dioxazine violet, and naphthol violet.

When the organic pigment particles are employed, hollow particles are particularly preferable. The hollow particles made of an organic polymer can be prepared by the conventional methods, for example, preparation methods as described in various references "Development of fine polymer particles" (by Toray Research Center), "Application of polymers having fine hollows" (by Toray Research Center), and "Technique and application of fine polymer particles" (by CMC).

For example, there are methods using emulsion polymerization, seed emulsion polymerization, soap-free polymerization, dispersion polymerization, combination of suspension polymerization and expansion, combination of seed polymerization and expansion, combination of seed polymerization and polymerization shrinkage, suspension polymerization for W/O/W emulsion, spray drying of liquid droplets, and a method of agglomerating a polymer emulsion by the addition of a solid electrolyte powder. The method for preparing the hollow polymer particles is not limited to the above-mentioned conventional methods.

A material of the organic polymer for constituting the hollow particles is selected from the conventional materials so that the material for the organic polymer is not soluble in a transparent dispersion medium to be employed.

The following materials, and improved materials in terms of the solvent resistance by performing the cross-linking are usable for the preparation of organic polymer hollow particles: styrene, styrene-acryl, styrene-isoprene, divinylbenzene, methyl methacrylate, methacrylate, ethyl methacrylate, ethyl acrylate, n-butyl acrylate, acrylic acid, acrylonitrile, acrylic rubber-methacrylate, ethylene, ethylene-acrylic acid, nylon, silicone, urethane, melamine, benzoguanamine, phenol, fluorine (tetrachloroethylene), vinylidene chloride, quaternary pyridinium salt, synthetic rubber, cellulose, cellulose acetate, chitosan, and calcium alginate.

There are commercially available products of hollow polymer particles prepared by any of the above-mentioned method using any of the above-mentioned materials, for example, "Ropaque" (trademark) made by Rohm and Haas Company, hollow particles available from JSR Corporation, thermally expandable microcapsules available from Matsumoto Yushi-Seiyaku Co., Ltd., "Grnngoll" (trademark) made by Dainippon Ink & Chemicals, Incorporated, and the like.

The hollow particles made of the organic polymers for use in the present invention may be dyed with a dye when necessary.

Among the above-mentioned pigment particles, titanium black, more specifically, black lower titanium oxide represented by general formula of $Ti_nO_{2n-1}$ is preferably used as the coloring powder (A) capable of moving through the dispersion medium by the application of an electric field.

The above-mentioned titanium black is prepared by sintering a mixture of titanium dioxide ($TiO_2$) and Ti under vacuum, and the structure of the obtained titanium oxide compound is represented by $Ti_nO_{2n-1}$. Depending upon the value represented by n in the formula, the obtained compound assumes various colors ranging from a black-based color (bronze, purple tinged black, and blue tinged black) to a gray color. The titanium black compounds assuming a variety of colors may be used alone, or in combination when necessary.

As the coloring powder (B) which is immovable in the dispersion medium when an electric field is applied from the outside, the previously mentioned hollow particles made of polymer materials are particularly preferable.

The above-mentioned pigment particles may be used as it is, or after they are subjected to surface modification.

A variety of surface modification methods commonly employed can be used for the pigment particles for use in the present invention. For example, the pigment particles may be coated with various kinds of compounds such as polymers, subjected to coupling treatment using a coupling agent, and subjected to graft polymerization. Furthermore, those pigment particles may be subjected to mechanochemical treatment. Composite particles may be prepared by carrying out the mechanochemical treatment using a plurality of pigment particles, using polymer particles and hollow particles, or using different kinds of resins.

The particle sizes of the coloring powders (A) and (B) may be determined according to the application of the obtained electrophoretic display medium. From the viewpoint of electrophoresis, it is preferable that each of the coloring powder (A) or (B) have a particle size of 0.01 to 100 $\mu$m. However, the particle sizes of the coloring powders (A) and (B) are not particularly limited.

In the present invention, there may be employed a plurality of coloring powders (A) capable of moving through the dispersion medium in response to an electric field applied from the outside, and a plurality of coloring powders (B) which does not move when the electric field is applied. Namely, the display liquid may comprise a dispersion medium, a plurality of coloring powders (A), for example, coloring powders A1, A2 and A3, and a plurality of coloring powders (B), for example, coloring powders B1, B2 and B3. As a matter of course, one kind of coloring powder (A), one kind of coloring powder (B) may be used in combination with a dispersion medium.

In the electrophoretic display method, display liquid, and display particles of the present invention, specific examples of the dispersion medium are aromatic hydrocarbons such as benzene, toluene, xylene, phenylxylyl ethane, diisopropyl naphthalene, and naphtenic hydrocarbons; aliphatic hydrocarbons such as hexane, dodecylbenzene, cyclohexane, kerosine, and paraffinic hydrocarbons; halogenated hydrocarbons such as chloroform, trichloroethylene, tetrachloroethylene, trifluoroethylene, tetrafluoroethylene, dichloromethane, and ethyl bromide; phosphoric acid esters such as tricresyl phosphate, trioctyl phosphate, octyldiphenyl phosphate, and tricyclohexyl phosphate; phthalic acid esters such as dibutyl phthalate, dioctyl phthalate, dilauryl phthalate, and dicyclohexyl phthalate; carboxylic acid esters such as butyl oleate, diethylene glycol dibenzoate, dioctyl sebacate, dibutyl sebacate, dioctyl adipate, trioctyl trimellitate, acetyl triethyl citrate, octyl maleate, dibutyl malepte, and ethyl acetate; isopropylbiphenyl; isoamylbiphenyl; chlorinated paraffin; diisopropylnaphthalene; 1,1-ditolyl ethane; 1,2-ditolyl ethane; 2,4-di-t-aminophenol; and N,N-dibutyl-2-butoxy-5-t-octylaniline.

Those organic solvents may be used alone or in combination.

The dispersion medium for use in the present invention may be colorless or colored.

As previously mentioned, when a black powder and a white powder are respectively used as the coloring powder (A) and the coloring powder (B), a colorless dispersion medium is advantageous in light of the obtained contrast, A colored dispersion medium is usable, which is prepared by dissolving a dye in a dispersion medium.

Specific examples of the dye suitable for the coloring of the dispersion medium include Spirit Black (SB, SSBS, AB), Nigrosine Base (SA, SAP, SAPL, EE, EEL, EX, EXSP, EB), Oil Yellow (105, 107, 129, 3G, GGS), Oil Orange (201, PS, PR), Fast Orange, Oil Red (5B, RR, OG), Oil Scarlet, Oil Pink 312, Oil Violet #730, Macrolex Blue RR, Sumiplast Green G, Oil Brown (GR, 416), Sudan Black X60, Oil Green (502, BG), Oil Blue (613, 2N, BOS), Oil Black (HBB, 860, BS), Varifast Yellow (1101, 1105, 3108, 4120), Varifast Orange (3209, 3210), Varifast Red (1306, 1355, 2303, 3304, 3306, 3320), Varifast Pink 2310N, Varifast Brown (2402, 3405), Varifast Blue (3405, 1501, 1603, 1605, 1607, 2606, 2610), Varifast Violet (1701, 1702), and Varifast Black (1802, 1807, 3804, 3810, 3820, 3830).

Furthermore, the display liquid of the present invention may further comprise a variety of auxiliary components conventionally used to control the surface electric charges of the coloring powders and enhance the dispersion properties of the coloring powders. To be more specific, a surfactant and protective colloid may be added to the formulation for the display liquid.

As the surfactant for use in the present invention, nonionic surfactants, anionic surfactants, cationic surfactants, and amphoteric surfactants may be used alone or in combination as long as the surfactants can be dissolved or dispersed in the employed dispersion medium.

Examples of the above-mentioned surfactants for use in the display liquid of the present invention are as follows:

Nonionic Surfactants

Polyoxyalkylene alkylphenol ethers such as polyoxyethylene nonylphenol ether, polyoxyethylene dinonylphenol ether, polyoxyethylene octylphenol ether, polyoxyethylene styrenated phenol, polyoxypolyoxyethylene bisphenol A, polyoxyethylene nonylphenyl ether, polyoxyethylene octylphenyl ether, and nonylphenoi ethoxylate.

Polyoxyalkylene ethers such as polyoxyethylene castor oil, polyoxyalkylene block polymer, polyoxyethylene cetyl ether, polyoxyethylene lauryl ether, polyoxyethylene oleyl ether, polyoxyethylene stearyl ether, and polyoxypropylene ether.

Glycols such as monool type polyoxyalkylene glycol, diol type polyoxyalkylene glycol, triol type polyoxyalkylene glycol, monool-based block type polyalkylene glycol, diol-based block type polyalkylene glycol, and random type polyalkylene glycol.

Primary straight chain alcohol ethoxylates such as octylphenol ethoxylate, oleyl alcohol ethoxylate, and lauryl alcohol ethoxylate; secondary straight chain alcohol ethoxylate; and alkyl alcohol ethers such as polynuclear phenol ethoxylate.

Polyoxyalkylene alkyl esters such as polyoxyethylene rosin ester, polyoxyethylene lauryl ester, polyoxyethylene oleyl ester, and polyoxyethylene stearyl ester.

Sorbitan fatty esters such as sorbitan monolaurate, sorbitan monopalmitate, sorbitan monostearate, sorbitan dilaurate, sorbitan dipalmitate, sorbitan distearate, sorbitan sesquilaurate, sorbitan sesquipalmitate, and sorbitan sesquistearate.

Polyoxyethylene sorbitan esters such as polyoxyethylene sorbitan monolaurate, polyoxyethylene sorbitan monopalmitate, polyoxyethylene sorbitan monostearate, polyoxyethylene sorbitan dilaurate, polyoxyethylene sorbitan dipalmitate, polyoxyethylene sorbitan distearate, polyoxyethylene sorbitan sesquilaurate, polyoxyethylene sorbitan sesquipalmitate, and polyoxyethylene sorbitan sesquistearate.

Fatty esters such as saturated fatty methyl ester, unsaturated fatty methyl ester, saturated fatty butyl ester, unsaturated fatty butyl ester, saturated fatty stearyl ester, unsaturated fatty stearyl ester, saturated fatty stearyl octyl ester, unsaturated fatty octyl ester, polyethylene glycol stearate, polyethylene glycol oleate, and rosin polyethylene glycol ester.

Fatty acids such as stearic acid, oleic acid, palmitic acid, lauric acid and myristic acid, and amides of these fatty acids.

Polyoxyethylene alkylamines such as polyoxyethylene laurylamine, polyoxyethylene alkylamine, and polyoxyethylene alkylamine ether.

Higher fatty acid monoethanol amides and higher fatty acid diethanol amides such as lauric acid monoethanol amide, and coconut fatty acid diethanol amide; amide compounds such as polyoxyethylene stearamide, coconut diethanol amide (1-2 type/1-1 type), and alkylalkylol amide; and alkanolamides.

Alkanolamines represented by $R$—$(CH_2CH_2O)_mH$ $(CH_2CH_2O)_nH$, $R$—$NH$—$C_3H_6$—$NH_2$ (wherein R is oleyl, octyl, dodecyl, tetradecyl, hexadecyl, octadecyl, coconut, beef tallow, soybean or the like), primary amines represented by $R$—$NH_2$ (wherein R is oleyl, octyl, dodecyl, tetradecyl, hexadecyl, octadecyl, coconut, beef tallow, soybean or the like), secondary amines represented by $R^1R^2$—$NH$ (wherein each of $R^1$ and $R^2$, which may be the same as the above-mentioned R, is oleyl, octyl, dodecyl, tetradecyl, hexadecyl, octadecyl, coconut, beef tallow, soybean or the like), tertiary amines represented by $R^1R^2R^3N$ (wherein each of $R^1$, $R^2$ and $R^3$ is oleyl, octyl, dodecyl, tetradecyl, hexadecyl, octadecyl, coconut, beef tallow, soybean or the like), various synthetic higher alcohols and various natural higher alcohols.

Polymers and oligomers such as acrylic acid-based compound, polycarboxylic acid-based compound, hydroxy fatty acid oligomer, hydroxy fatty acid oligomer modified material.

Anionic Surfactants

Carboxylic acid salts such as polycarboxylic acid type polymeric surfactant, polycarboxylic acid type anionic surfactant, special fatty acid soap, and rosin soap.

Alcohol-based sulfate ester salts such as castor oil sulfate ester salt, sulfate ester Na salt of lauryl alcohol, sulfate ester amine salt of lauryl alcohol, sulfate ester Na salt of natural alcohol, and sulfate ester Na salt of higher alcohol; and other sulfate esters such as sulfate ester amine salt of lauryl alcohol ether, sulfate ester Na salt of lauryl alcohol ether, sulfate ester amine salt of synthetic higher alcohol ether, sulfate ester Na salt of synthetic higher alcohol ether, alkylpolyether sulfate ester amine salt, alkylpolyether sulfate ester Na salt, natural alcohol EO (ethylene oxide) adduct-based sulfate ester amine salt, natural alcohol EO (ethylene oxide) adduct-based sulfate ester Na salt, synthetic alcohol EO (ethylene oxide) adduct-based sulfate ester amine salt, synthetic alcohol EO (ethylene oxide) adduct-based sulfate ester amine salt, synthetic alcohol EO (ethylene oxide) adduct-based sulfate ester Na salt, alkyl phenol EO (ethylene oxide) adduct-based sulfate ester amine salt, alkyl phenol EO (ethylene oxide) adduct sulfate ester Na salt, polyoxyethylene nonylphenyl ether sulfate ester amine salt, polyoxyethylene nonylphenyl ether sulfate ester Na salt, polyoxyethylene polycyclic phenyl ether sulfate ester amine salt, and polyoxyethylene polycyclic phenyl ether sulfate ester Na salt.

Sulfonic acid salts such as varieties of alkylarylsulfonic acid amine salts, varieties of alkylarylsulfonic acid Na salts, naphthalenesulfonic acid Na salt, varieties of alkylbenzene sulfonic acid amine salts, varieties of alkylbenzene sulfonic acid Na salts, naphthalenesulfonic acid condensate, and naphthalenesulfonic acid formalin condensate.

Polyoxyalkylene-based sulfonic acid salts such as polyoxyethylene nonylphenyl ether sulfonic acid amine salt, polyoxyethylene nonylphenyl ether sulfonic acid Na salt, polyoxyethylene special aryl ether sulfonic acid amine salt, polyoxyethylene special aryl ether sulfonic acid Na salt, polyoxyethylene tridecylphenyl ether sulfonic acid amine salt, polyoxyethylene tridecyl phenyl ether sulfonic acid Na salt, polyoxyethylene alkyl ether sulfonic acid amine salt, and polyoxyethylene alkyl ether sulfonic acid Na salt.

Sulfosuccinate salts such as dialkylsulfosuccinate amine salt, dialkylsulfosuccinate Na salt, polycyclic phenylpolyethoxysulfosuccinate amine salt, polycyclic phenylpolyethoxysulfosuccinate Na salt, polyoxyethylene alkyl ether sulfosuccinic monoester amine salt, and polyoxyethylene alkyl ether sulfosuccinic acid monoester Na salt.

Phosphoric esters and phosphates such as alkyl phosphoric ester, alkoxyalkyl phosphoric ester, higher alcohol phosphoric ester, higher alcohol phosphate, alkylphenol type phosphoric ester, aromatic phosphoric ester, polyoxyalkylene alkyl ether phosphoric ester, and polyoxyalkylene alkylaryl ether phosphoric ester.

Cationic Surfactants

Alkyltrimethylamine-based tertiary ammonium salts represented by R—N (CH$_3$)3X wherein R is stearyl, acetyl, lauryl, oleyl, dodecyl, coconut, soybean, beef tallow, or like, and x is halogen, amine or the like), tetramethylamine-based salts, tertiary ammonium salts such as tetrabutylamine salts, and acetates represented by (RNCH$_3$) (CH$_3$COO) wherein R is stearyl, acetyl, lauryl, oleyl, dodecyl, coconut, soybean, beef tallow, or the like.

Benzylamine-based tertiary ammonium salts such as lauryldimethylbenzylammonium salts (halogen, amine salts or the like), stearyldimethylbenzylammonium salts (halogen, amine salts or the like), dodecyldimethylbenzylammonium salts (halogen, amine salts or the like), and polyoxyalkylene-based tertiary ammonium salts represented by R(CH$_3$)N (C$_2$H$_4$O)$_m$H(C$_2$H$_4$O)$_n$.X wherein R is stearyl, acetyl, lauryl, oleyl, dodecyl, coconut, soybean, beef tallow, or like, and X is halogen, amine or the like.

Amphoteric Surfactants

Varieties of Betain type surfactants, varieties of imidazoline-based surfactants, β-alanine type surfactants, and polyoctylpolyaminoethylglycine hydrochloride salt.

As the protective colloid for use in the display liquid, there can be employed a variety of protective colloids capable of being dissolved or dispersed in the employed dispersion medium.

The electrophoretic display liquid of the present invention may be enclosed in microcapsules, whereby electrophoretic display particles of the present invention can be obtained. In this case, the microcapsules can be obtained by interfacial polymerization, in-situ polymerization, or coacervation.

Examples of the material for forming a shell of the microcapsule are polyurethane, polyurea, polyurea-polyurethane, urea-formaldehyde resin, melamine-formaldehyde resin, polyamide, polyester, polysulfonamide, polycarbonate, polysulfinate, epoxy resin, acrylic ester, methacrylic ester, vinyl acetate, and gelatin.

It is preferable that the diameter of microcapsules for use in the electrophoretic display particles be in the range of about 0.5 to 500 μm, more preferably about 1.0 to 100 μm.

The dispersion medium, the coloring powder (A), the coloring powder (B), and other additive components may be contained in the electrophoretic display liquid of the present invention at arbitrary ratios. When the coloring powder (A) in an amount of 0.01 to 8.0 g and the coloring powder (B) in an amount of 0.01 to 8.0 g are contained in 10 ml of the dispersion medium, preferable results can be obtained.

The present invention also provides an electrophoretic display medium employing the previously mentioned electrophoretic display liquid or electrophoretic display particles, and an electrophoretic display method using the above prepared display medium. Preferable embodiments of the display medium of the present invention are as follows. The substrate used in the present invention includes both a substrate having a surface with an electrode and a substrate without such a surface as provided with an electrode.

(1) A display medium comprises a pair of substrates, at least one of the substrates being transparent and at least any one of the substrates having a surface provided with an electrode. The electrode surface of one of the substrates is disposed to face the other substrate via spacers to provide an enclosed space therebetween, which space is filled with the above-mentioned display liquid of the present invention. (FIG. 1)

(2) A display medium comprises a pair of substrates, at least one of the substrates being transparent and at least any one of the substrates having a surface provided with an electrode. These substrates are disposed in such a configuration that the electrode surface of one of the substrates faces the other substrate, using spacers or not, so that a space is provided between the substrates. In this case, a matrix material is discontinuously arranged in the space, with the matrix material being filled with the above-mentioned display liquid of the present invention. (FIG. 2)

(3) A display medium comprises a pair of substrates, at least one of the substrates being transparent and at least any one of the substrates having a surface provided with an electrode. These substrates are disposed in such a configuration that the electrode surface of one of the substrates faces the other substrate, using spacers or not, so that a space is provided between the substrates. In this case, the space is filled with the above-mentioned display particles comprising microcapsules according to the present invention. (FIG. 3)

(4) A display medium comprises a pair of substrates, at least one of the substrates being transparent and at least any one of the substrates having a surface provided with an electrode. These substrates are disposed in such a configuration that the electrode surface of one of the substrates faces the other substrate, using spacers or not, so that a space is provided between the substrates. In this case, a matrix material is discontinuously arranged in the space, with the matrix material being filled with the above-mentioned display particles of the present invention. (FIG. 4)

(5) A display medium comprises a substrate which may be transparent or not, the substrate having one surface provided with an electrode. A mixture of the matrix material and the display liquid or the display particles according to the present invention is coated on the electrode surface of the substrate. (FIG. 5)

(6) A display medium comprises a substrate which may be transparent or not, the substrate having one surface provided with an electrode. A mixture of the matrix material and the display liquid or the display particles according to the present invention is coated on the electrode surface of the substrate to provide a layer on the substrate. An overcoat layer is further provided on the above prepared layer. (FIG. 6)

(7) Furthermore, it is preferable that the above-mentioned matrix material for use in the embodiments (2), (4), (5) and (6) and the overcoat layer in the embodiment (6) comprise a thermosetting resin and/or activation energy curing resin.

(8) The display medium may further comprise a printing layer which is provided at least one portion of the display medium in the above-mentioned embodiments (1) to (5) and/or at least one portion of the overcoat layer in the embodiment (6).

(9) Furthermore, it is preferable that a printing protection layer be overlaid on the above-mentioned printing layer in the embodiment (8).

(10) In the above-mentioned display medium, there is provided a display portion capable of recording an image on the display medium and erasing the same therefrom by controlling the application of an electric field thereto. In addition to the above-mentioned display portion, there may also be provided in the display medium an information recording portion capable of forming an information therein and erasing the same therefrom by any other methods than the method of controlling the application of an electric field.

(11) The above-mentioned information recording portion can record information therein and read the recorded information therefrom by a magnetic action.

(12) The information recording portion as mentioned in the embodiment (10) may be an integrated circuit memory or an optical memory.

(13) The information recording portion can record information therein and read the recorded information therefrom by an optical action.

(14) The above-mentioned information recording portion may be an information for identifying the front or rear side of the display medium and/or identifying the position or the display medium.

The present invention also provides an electrophoretic display apparatus which comprises the above-mentioned electrophoretic display medium and a recording unit capable of displaying a visible information on the display medium, the display medium and the recording unit being designed to come in contact with each other at least in recording operation. The recording unit may be equipped with an electrode array which can apply an electric field to the display medium according to image signals and which has a mechanism for shifting the relative position on the same plane with respect to the display medium. Namely, with the common electrode of the display medium being used as the ground potential, the electrode array is brought into close contact with the surface of the display medium and a potential is applied to the predetermined position of the display medium depending upon the corresponding image signal as the electrode array is shifting its position on the same plane relative to the display medium. Thus, a visible display can be achieved.

In the electrophoretic display apparatus of the present invention, the recording unit may be provided with an ion beam array which can impart electric charges to the surface of the display medium according to image signals and which can shift its position on the same plane relative to the display medium. Namely, with the common electrode of the display medium being used as the ground potential, the ion beam array is disposed in proximity to the surface of the display medium and a potential is applied to the predetermined position of the display medium depending upon the corresponding image signal as the ion beam array is shifting its position on the same plane relative to the display medium. Thus, a visible display can be achieved.

The electric charges given to the surface of the display medium by the ion beam array are dissipated defending on a time constant of the material constituting the display medium. When the above-mentioned time constant is longer than the time when the coloring powder moves through the dispersion medium, which can be referred to as a response time of the coloring powder, the charging time by the ion beam array can be set to be shorter than the response time. The result is that the recording speed can be increased.

In the electrophoretic display apparatus of the present invention, the recording unit may be provided with a plurality of signal electrodes and a plurality of scanning electrodes, each of the intersecting points of the signal electrodes and the scanning electrodes being provided with a switching element capable of applying an electric field to the surface of the display medium according to image signals. Thus, a visible image can be displayed on the display medium in the display apparatus. According to such a structure, the electric field application means laid out on a grid pattern is provided with switching elements. Therefore, electric charges are selectively applied to a predetermined portion of the display medium by the action of a switching element, and the applied charges are dissipated-depending upon a time constant of the material constituting the display medium during non-charging time. When the above-mentioned time constant is longer than the response time of the coloring powder, it becomes possible to shorten the charging time as compared with the response time. Thus, the recording speed can be increased.

Furthermore, it is preferable that the switching element be a thin-film transistor, in particular, with a large area because of facility of the preparation.

The thin-film transistor is a three terminal element, so that the switching performance thereof is high, and clear display can be obtained even though halftone is included.

In order to further increase the recording speed, a storage condenser and the display medium may be connected in parallel as equivalent circuit.

The display medium of the present invention can be used for various applications.

For example, a name card or credit card may include a portion made of the electrophoretic display medium, or such a card may be entirely made of the electrophoretic display medium of the present intention. In such a case, the card becomes an information rewritable card, so that this kind of card can be used as a variety of point cards and membership cards.

The above-mentioned small-size card using the display medium of the present invention is advantageous in terms of handiness. Further, by increasing the size of the card, the display medium can be used as a recording sheet for a copying machine and printer for office use. In this case, the electrophoretic display medium of the present invention is prepared in the form of a reversible display sheet.

The reversible display sheet can be repeatedly used, so that this type of sheet is regarded as an excellent medium from the viewpoints of resource saving and energy saving.

In addition, when the electrophoretic display medium of the present invention is set in various articles such as household electric appliances, the display medium can provide some information instead of the conventional liquid crystal monitoring panel. The display medium used as such a panel can achieve excellent display because of a wide angle of field and a high contrast.

Furthermore, the electrophoretic display medium of the present invention is applicable to various kinds of billboards and signboards. In this case, the billboard and signboard may be entirely made of the display medium of the present invention. Alternatively, a billboard in which the display medium of the present invention is partially incorporated can be made remarkably impressive.

The display medium of the present invention can be made flexible on account of its structure. Therefore, the shape of the above-mentioned card, sheet, display panel, signboard, or billboard is not restricted. Namely, the display medium of the present invention can cope with a wide range of applications.

Some preferable embodiments of the display medium according to the present invention will now be explained in detail with reference to FIG. 1 to FIG. 6.

In FIG. 1 through FIG. 6, a substrate 1 is a glass plate or a plastic film and has one surface provided with an electrode 1'.

It is preferable that the substrate 1 have a thickness of about 10 $\mu$m to 5 mm, and more preferably about 25 to 200 $\mu$m.

The electrode 1' may be arranged in a matrix pattern or not.

A substrate 2, which is also a glass plate or a plastic film, is not provided with an electrode. Similar to the substrate 1, the substrate 2 may have a thickness of about 10 $\mu$m to 5 mm, preferably about 25 to 200 $\mu$m.

When a display medium is fabricated using a pair of substrates (a pair of substrates 1 or combination of a substrate 1 and a substrate 2), as illustrated in FIG. 1 to FIG. 4, at least one of the substrates may be transparent. The substrate not serving as the display surface of the display medium may be transparent or not. Alternatively, the substrate not serving as the display surface may be colored, and in this case, the color of the substrate can be used as a part of colors displayed on the display surface.

In an electrophoretic display medium comprising one substrate as shown in FIG. 5 or 6, the substrate 1 may be transparent or not. Further, the substrate 1 may be colored, and in this case, the color of the substrate 1 can be used as a part of displayed colors.

The electrode 1' may be transparent or not, and may be colored when necessary. The electrode 1' is made of an electroconductive thin film of a metal, ITO, $SnO_2$, or a mixture of ZnO and Al, which is prepared by sputtering, vacuum deposition, chemical vapor deposition (CVD), or coating. The electrode 1' is required to be transparent when attached to the substrate 1 serving as the display surface. In such a case, the transparent material such as ITO, $SnO_2$, or a mixture of ZnO and Al is used for the preparation of the electrode 1'.

A display medium of FIG. 1 is constructed in such a way that a pair of substrates (a pair of substrates 1 in FIG. 1A, or combination of the substrate 1 and the substrate 2 in FIG. 1B) are disposed to face each other via spacers 3 so that an enclosed space can be formed between the substrates. The space thus formed is filled with an electrophoretic display liquid of the present invention, so that a recording layer 4 is provided.

In FIG. 2A and FIG. 2B, a pair of substrates (a pair of substrates 1 in FIG. 2A, or combination of the substrate 1 and the substrate 2 in FIG. 2B) are disposed to face each other via spacers 3 so that an enclosed space can be formed between the substrates. The space thus formed between the substrates is partitioned by using a matrix material in which a display liquid of the present invention is held. Thus, there can be provided a recording layer 3 which is discontinuously formed between the substrates.

To provide the above-mentioned recording layer 5, the display liquid is dispersed in a solution, dispersion, suspension, or emulsion where a matrix material is dissolved, dispersed, suspended, or emulsified. The dispersion thus prepared is coated on the electrode 1' by wire bar coating, roll coating, blade coating, dip coating, spray coating, spin coating, or gravure coating method, and dried.

Alternatively, the above-mentioned solution, dispersion, suspension, or emulsion of a matrix material is first coated on the electrode 1' by wire bar coating, roll coating, blade coating, dip coating, spray coating, spin coating, or gravure coating method, and dried, and thereafter the display liquid of the present invention may be injected into the matrix material.

As the matrix material, the same materials as used for forming a shell of the previously mentioned microcapsules are usable. In addition, there can be employed the following materials: polyethylene, polypropylene, polystyrene, poly(vinyl chloride), poly(vinylidene chloride), vinyl chloride-vinyl acetate copolymer, poly(vinyl butyral), poly(vinyl alcohol), poly(ethylene oxide), poly(propylene oxide), ethylene-vinyl alcohol copolymer, polyacetal, acrylic resin, methyl cellulose, ethyl cellulose, phenolic resin, fluoroplastics, silicone resin, diene resin, polystyrene based thermoplastic elastomer, polyolefin based thermoplastic elastomer, polyurethane based thermoplastic elastomer, polyester based thermoplastic elastomer, polyphenylene ether, polyphenylene sulfide, polyether sulfone, polyether ketone, polyallylate, aramid, polyimide, poly-p-phenylene, poly-p-xylene, poly-p-phenylenevinylene, polyhydantoin, polyparabanic acid, polybenzoimidazole, polybenzothiazol, polybenzooxadiazol, and polyquinozaline. It is preferable that the matrix material for use in the recording layer 5 comprise at least one selected from the group consisting of the above-mentioned thermosetting resins, activation energy curing resins, and mixtures thereof.

In a display medium of FIG. 3, a pair of substrates (a pair of substrates 1 as in FIG. 3A and FIG. 3C, or combination of the substrate 1 and the substrate 2 as in FIG. 3B and FIG. 3D) are disposed to face each other so that an enclosed space can be formed between the substrates. The space between the substrates is filled with the electrophoretic display particles (microcapsules) of the present invention. Thus, a recording layer 6 is provided. In this embodiment, the substrates are disposed via spacers 3 as shown in FIG. 3A and FIG. 3B, or without spacers as shown in FIG. 3C and FIG. 3D.

In a display medium of FIG. 4, the space between the substrates is irregularly partitioned by using the same matrix material as in FIG. 2. In this case, the matrix material holds the display particles of the present invention therein. Thus, a recording layer 7 can be provided in the same manner as in FIG. 2 except that the display liquid was replaced by the display particles for use in the matrix material.

A display medium of FIG. 5 is fabricated by providing a recording layer 7 or 5 on the electrode 1' attached to the substrate 1. The recording layer 5 as illustrated in FIG. 5B comprises a matrix material and a display liquid dispersed in the matrix material in a similar manner as in FIG. 2. The recording layer 7 as illustrated in FIG. 5A comprises a matrix material and display particles dispersed in the matrix material in a similar manner as in FIG. 4.

To provide the above-mentioned recording layer 7 shown in FIG. 5A, the electrophoretic display particles of the present invention are dispersed in a solution, dispersion, suspension, or emulsion where a matrix material is dissolved, dispersed, suspended, or emulsified. The dispersion thus prepared is coated on the electrode 1' by wire bar coating, roll coating, blade coating, dip coating, spray coating, spin coating, or gravure coating method, and dried.

An overcoat layer 8 is overlaid on the recording layer 7 of FIG. 5A and the recording layer 5 of FIG. 5B, whereby display media of FIG. 6A and FIG. 6B can be respectively obtained. The same materials as used for the matrix material are usable for the overcoat layer 8.

To provide the above-mentioned overcoat layer 8 shown in FIG. 6A and FIG. 6B, a curing agent and a catalyst and/or co-catalyst may be added to a solution, dispersion, suspension, or emulsion where a matrix material is dissolved, dispersed, suspended, or emulsified, thereby preparing a composition of the overcoat layer. The composition of the overcoat layer thus prepared is coated on the recording layer by wire bar coating, roll coating, blade coating, dip coating, spray coating, spin coating, or gravure coating method, or sputtering and chemical vapor phase method.

It is desirable to decrease the thickness of the overcoat layer 8 as much as possible so long as the overcoat layer 8 is provided with the property of protecting the recording layer 5 or 7. The overcoat layer 8 may have a thickness of about 0.1 to 100 $\mu$m, preferably 0.3 to 30 $\mu$m.

Further, a preferable embodiment of the electrophoretic display medium according to the present invention will now be described with reference to FIG. 7.

In an electrophoretic display medium of FIG. 7, a recording layer 7 and an overcoat layer 8 are successively provided on an electrode 1' attached to a substrate 1 in the same manner as in FIG. 6A. In this case, a recording layer 5 as well as the recording layer 7 is usable. When the overcoat layer 8 side is used as a display surface, a printing layer 9 may be further provided on the overcoat layer 8 by the conventional method so that the display portion on the display surface is not hindered by the printing layer 9.

In FIG. 7, a printing protection layer 10 is further provided on the printing layer 9 and the overcoat layer 8 by the same method as in the case of the formation of the overcoat layer 8 and the printing layer 9. The material for the printing protection layer 10 is the same as that for the overcoat layer 8.

On the non-display surface of the display medium of FIG. 7, that is, the substrate 1 side, opposite to the display surface, that is, of the overcoat layer 8 side, a magnetic recording portion 11 and an integrated circuit memory 12 may be partially provided, and a protective layer 13 is formed on the substrate 1 as shown in FIG. 7.

The same materials for the overcoat layer 8 and the printing protection layer 10 are usable for the protective layer 13.

Another embodiment of the display medium according to the present invention will now be explained with reference to FIG. 8.

Figure 8A:
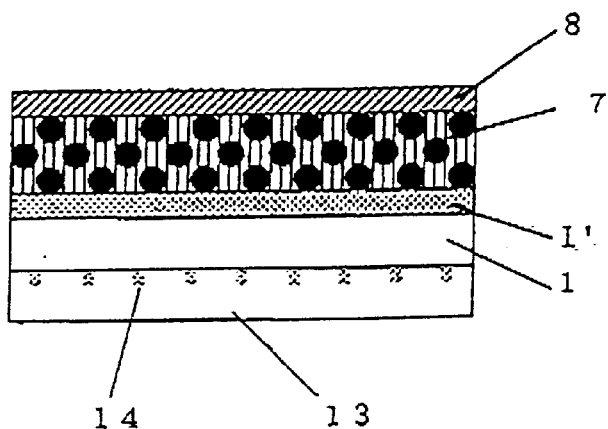
FIG. 8A is a schematic cross-sectional view showing an eighth embodiment of the electrophoretic display medium according to the present invention.

In FIG. 8A, a recording layer 7 and an overcoat layer 8 are successively provided on an electrode 1' attached to a substrate 1 in the same manner as in FIG. 6A. In this case, a recording layer 5 as well as the recording layer 7 is usable. A transparent recording portion 14 is provided on the rear surface of the substrate 1, opposite to the recording layer 7 with respect to the substrate 1. A protective layer 13 is further provided so as to protect the transparent recording portion 14.

Figure 8B:
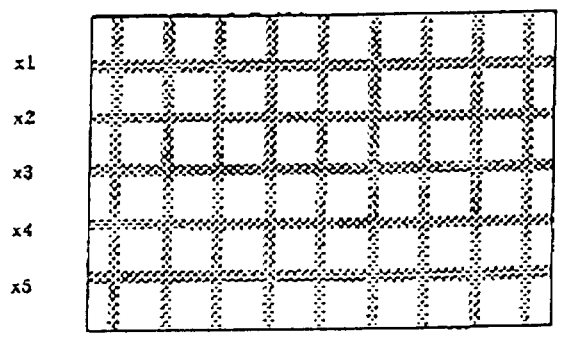
FIG. 8B is a plan view of the display medium of FIG. 8A, viewed from the side of reference numeral 13.

FIG. 8B is a plan view of the display medium of FIG. 8A, viewed from the protective layer 13 side. As shown in FIG. 8B, a transparent recording portion 14 is arranged on a grid pattern. The intersecting point $(x_n, y_n)$ of a row $(x_n)$ and a column $(y_n)$ can be used as a particular digital information which can only be read.

In the display medium as shown in FIG. 8A, not only the surface of the overcoat layer 8, but also the surface of the protective layer 13 can serve as the display surface by using transparent substrate 1 and electrode 1'.

Preferable embodiments of the electrophoretic display apparatus according to the present invention will now be explained with reference to FIG. 9 and FIG. 10.

Figure 9:
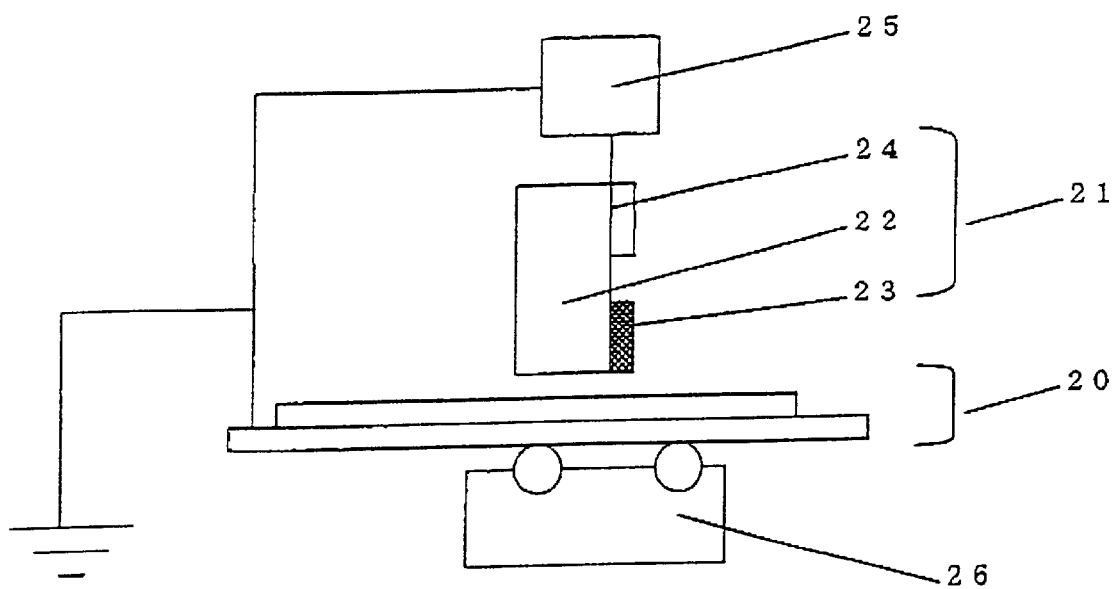
FIG. 9 is a schematic diagram showing one embodiment of the display apparatus according to the present invention.

In FIG. 9, reference numeral 20 indicates an electrophoretic display medium of the present invention; reference numeral 21, an electrode array; reference numeral 22, a recording substrate; reference numeral 23, an electrode rod; reference numeral 24, a switching circuit; reference numeral 25, a power supply circuit; and reference numeral 26, a feeding mechanism.

Figure 10:
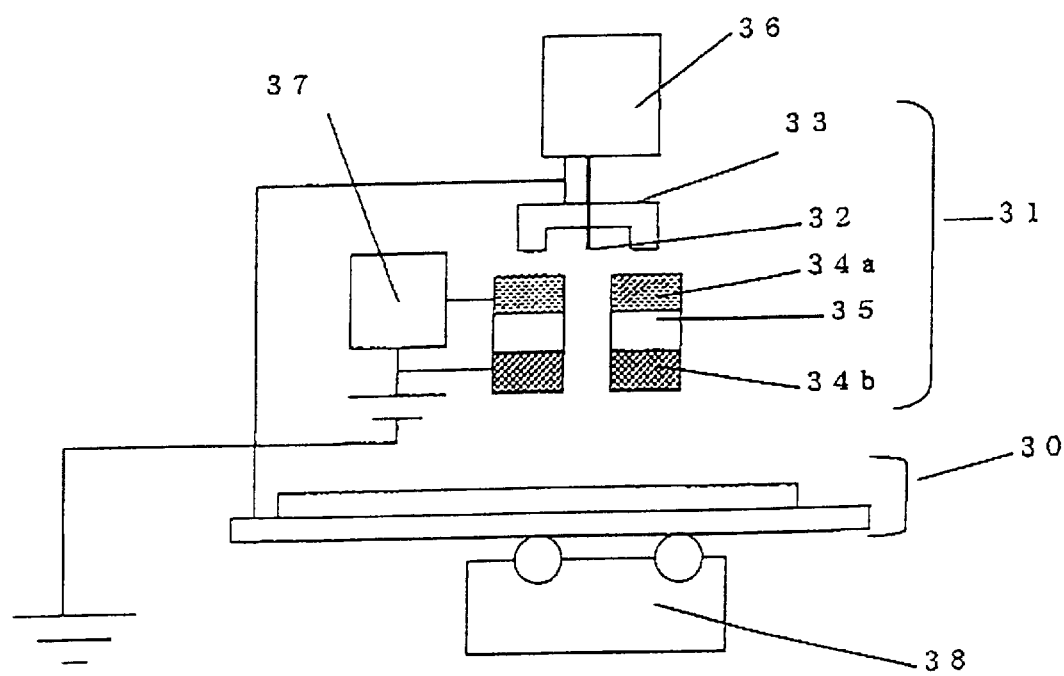
FIG. 10 is a schematic diagram showing another embodiment of the display apparatus according to the present invention.

In FIG. 10, reference numeral 30 indicates an electrophoretic display medium of the present invention; reference numeral 31, an ion beam array; reference numeral 32, a corona wire; reference numeral 33, a discharge frame; reference numerals 34a and 34b, control electrodes; reference numeral 35, an aperture; reference numeral 36, a high voltage power supply for generating corona ion; reference numeral 37, a power supply for controlling ion flow; and reference numeral 38, a feeding mechanism.

Other features of this invention will become apparent in the course of the following description of exemplary embodiments, which are given for illustration of the invention and are not intended to be limiting thereof.

EXAMPLE 1

Measurement of Electrophoretic Properties of Coloring Powders 1.0 g of oleic acid and 0.1 g of titanium black (black titanium oxide made by Ako Kasei Co., Ltd.) were added to 7.6 g of dodecylbenzene, followed by the application of ultrasonic wave. Thus, a dispersion A was prepared.

A pair of glass plates, each being coated with a transparent electrode film (ITO film) were disposed via spacers to have an enclosed space therebetween in such a configuration that both electrode films were directed to each other. The above prepared dispersion A was injected into the space between the glass plates, and the electrodes were secured with clips to prepare a measuring cell. A direct-current power supply was connected to the measuring cell and a voltage was applied thereto so that the intensity of the applied electric field was 10 kV/cm. Thereafter, the clips were removed and the glass plates were split to observe the condition of the dispersion A at both portions adjacent to the glass plates.

As a result, a black dispersion remained around one of the surface portions, while a colorless dispersion medium was observed around another surface portion. It was confirmed that the titanium black particles for use in the dispersion A have the property of electrophoretically moving through the dispersion medium in response to the applied electric field with a predetermined intensity.

1.0 g of oleic acid and 0.1 g of hollow particles made of a cross-linked styrene-acrylic resin (made by JSR Corporation) were added to 7.6 g of dodecylbenzene. The resultant mixture was dispersed in a ball mill to prepare a dispersion B.

A pair of glass plates, each being coated with a transparent electrode film (ITO film) were disposed via spacers to have an enclosed space therebetween in such a configuration that both electrode films were directed to each other. The above prepared dispersion B was injected into the space between the glass plates, and the electrodes were secured with clips to prepare a measuring cell. A direct-current power supply was connected to the measuring cell and a voltage was applied thereto so that the intensity of the applied electric field was 10 kV/cm. Thereafter, the clips were removed and the glass plates were split to observe the condition of the dispersion B at both portions adjacent to the glass plates.

As a result, a white dispersion remained around both surface portions. It was confirmed that the hollow particles of cross-linked styrene-acrylic resin for use in the dispersion B are electrophoretically immovable in the dispersion medium when the electric field with a predetermined intensity is applied.

Preparation of Display Liquid 1.0 g of oleic acid and 1.0 g of hollow particles made of a cross-linked styrene-acrylic resin (made by JSR Corporation) were added to 7.6 g of dodecylbenzene. The resultant mixture was dispersed in a ball mill to prepare a dispersion. 0.1 g of titanium black (black titanium oxide made by Ako Basei Co., Ltd.) was added to the above dispersion, followed by the application of ultrasonic wave. Thus, an electrophoretic display liquid No. 1 of the present invention was prepared.

Evaluation of Display Liquid

A pair of glass plates, each being coated with a transparent electrode film (ITO film) were disposed via spacers to have an enclosed space therebetween in such a configuration that both electrode films were directed to each other. The above prepared display liquid No. 1 was injected into the space between the glass plates, and the electrodes were secured with clips to prepare a measuring cell. A direct-current power supply was connected to the measuring cell and a voltage was applied thereto so that the intensity of the applied electric field was 10 kV/cm. Thereafter, the clips were removed and the glass plates were split to observe the condition or the display liquid No. 1 at both portions adjacent to the glass plates.

As a result, a black color layer and a white color layer were separately observed around one of the surface portions, while only a white dispersion appeared around another surface portion. It was confirmed that the titanium black particles are selectively caused to electrophoretically migrate through the dispersion medium in response to the applied electric field, and the hollow particles are caused to stay in the dispersion medium.

Fabrication of Display Apparatus

A pair of 3-mm thick transparent glass plates, each being coated with a transparent electrode film (ITO film) were disposed via nylon beads to have an enclosed space with a thickness of about 150 μm therebetween in such a configuration that both electrode films were directed to each other. The above prepared display liquid No. 1 was injected into the space between the glass plates, and the glass plates were sealed together with an epoxy resin adhesive. Thus, a panel-shaped electrophoretic display medium was obtained.

A direct-current power supply was connected to the panel-shaped display medium to apply a voltage thereto.

The result was that the display surface showed a remarkable contrast between white color and black color. The reflectance of each color displayed on the display surface was measured in such a manner that incident angle was 45° and the reflected light was received at a position perpendicular to the display surface. The contrast, which was determined from the ratio of the reflectances of the black and white colors was 10.0.

EXAMPLE 2

Measurement of Electrophoretic Properties of Coloring Powders 1.0 g of hydroxy-fatty acid oligomer and 0.1 g of titanium black (black titanium oxide made by Ako Kasei Co., Ltd.) were added to 7.6 g of phenylxylyl ethane, followed by the application of ultrasonic wave. Thus, a dispersion C was prepared.

A pair of glass plates, each being coated with a transparent electrode film (ITO film) were disposed via spacers to have an enclosed space therebetween in such a configuration that both electrode films were directed to each other. The above prepared dispersion C was injected into the space between the glass plates, and the electrodes were secured with clips to prepare a measuring cell. A direct-current power supply was connected to the measuring cell and a voltage was applied thereto so that the intensity of the applied electric field was 10 kV/cm. Thereafter, the clips were removed and the glass plates were split to observe the condition of the dispersion C at both portions adjacent to the glass plates.

As a result, a black dispersion remained around one of the surface portions, while a colorless dispersion medium was observed around another surface portion. It was confirmed that the titanium black particles for use in the dispersion C have the property of electrophoretically moving through the dispersion medium in response to the applied electric field with a predetermined intensity.

1.0 g of hydroxy-fatty acid oligomer and 0.1 g of hollow particles made of a cross-linked styrene-acrylic resin (made by JSR Corporation) were added to 7.6 g of phenylxylyl ethane. The resultant mixture was dispersed in a ball mill to prepare a dispersion D.

A pair of glass plates, each being coated with a transparent electrode film (ITO film) were disposed via spacers to have an enclosed space therebetween in such a configuration that both electrode films were directed to each other. The above prepared dispersion D was injected into the space between the glass plates, and the electrodes were secured with clips to prepare a measuring cell. A direct-current power supply was connected to the measuring cell and a voltage was applied thereto so that the intensity of the applied electric field was 10 kV/cm. Thereafter, the clips were removed and the glass plates were split to observe the condition of the dispersion D at both portions adjacent to the glass plates.

As a result, a white dispersion remained around both surface portions. It was confirmed that the hollow particles of cross-linked styrene-acrylic resin for use in the dispersion D are electrophoretically immovable in the dispersion medium when the electric field with a predetermined intensity is applied.

Preparation of Display Liquid 1.0 g of hydroxy-fatty acid oligomer and 1.0 g of hollow particles made of a cross-linked styrene-acrylic resin (made by JSR Corporation) were added to 7.6 g of phenylxylyl ethane. The resultant mixture was dispersed in a ball mill to prepare a dispersion. 0.1 g of titanium black (black titanium oxide made by Ako Kasei Co., Ltd.) was added to the above dispersion, followed by the application of ultrasonic wave. Thus, an electrophoretic display liquid No. 2 of the present invention was prepared.

Fabrication of Display Apparatus

A pair of 3-mm thick transparent glass plates, each being coated with a transparent electrode film (ITO film) were disposed via nylon beads to have an enclosed space with a thickness of about 150 μm therebetween in such a configuration that both electrode films were directed to each other. The above prepared display liquid No. 2 was injected into the space between the glass plates, and the glass plates were sealed together with an epoxy resin adhesive. Thus, a panel-shaped electrophoretic display medium was obtained.

A direct-current power supply was connected to the panel-shaped display medium to apply a voltage thereto.

The result was that the display surface showed a remarkable contrast between white color and black color. The reflectance of each of the colors displayed on the display surface was measured in such a manner that incident angle was 45° and the reflected light was received at a position perpendicular to the display surface. The contrast, which was determined from the ratio of the reflectances of the black and white colors was 11.3.

EXAMPLE 3

Preparation of Display Particles

An aqueous solution of gelatin and an aqueous solution of gum arabic were mixed and heated to 50° C. The resultant mixture was adjusted to pH9 by the addition of an aqueous solution of sodium hydroxide.

The display liquid No. 2 prepared in Example 2 was added to the above mixture of the gelatin solution and the gum arabic solution, and the resultant mixture was stirred and emulsified. The pH value of the mixture was gradually decreased to 4 to precipitate a concentrated solution of gelatin and gum arabic at the interface of the dispersion. Thereafter, the film thus prepared set to gel as the temperature was decreased, and was cured by the addition thereto of an aqueous solution of glutaraldehyde. Thus, there was prepared a slurry of microcapsules of which the shell material was gelatin. The emulsifying conditions were controlled so that the particle size of the obtained microcapsules was about 50 μm. Thus, electrophoretic display particles according to the present invention were obtained.

Fabrication of Display Apparatus 20 g of the above obtained electrophoretic display particles (microcapsules) was added to 80 g of a 10% aqueous solution of poly(vinyl alcohol) to prepare a dispersion. The dispersion was coated on the ITO-film deposited surface of a polycarbonate substrate using an applicator with a gap or 250 μm, and dried, so that a recording layer comprising the microcapsules was provided on the substrate.

A sample piece was cut from the above-mentioned microcapsule-bearing substrate. A glass plate with an ITO film was placed on the recording layer of the sample piece in such a configuration that the ITO film of the glass plate was brought into close contact with the recording layer, and the glass plate and the polycarbonate substrate were fixed with an adhesive tape. Thus, an electrophoretic display cell was prepared.

A direct-current power supply was connected to the display cell to apply a voltage thereto.

The result was that the display surface showed a remarkable contrast between white color and black color. The reflectance of each of the colors displayed on the display surface was measured in such a manner that incident angle was 45° and the reflected light was received at a position perpendicular to the display surface. The contrast, which was determined from the ratio of the reflectances of the black and white colors was 8.2.

EXAMPLE 4

Fabrication of Display Apparatus

A transparent electroconductive film (ITO film) was formed on one surface of a 3-mm thick transparent glass plate to prepare an insulating substrate. A polyacrylate resin plate (Trademark "EMBLET" made by Unitika, Ltd.) was disposed to face the ITO film side of the glass plate via nylon beads to have an enclosed space with a thickness of about 150 μm therebetween. The above prepared display liquid No. 2 prepared in Example 2 was injected into the space between the glass plate and the polyacrylate resin plate, and those plates were sealed together with an epoxy resin adhesive. Thus, a panel-shaped electrophoretic display medium was obtained.

An ITO-film deposited glass plate was placed on the polyacrylate resin plate, and a direct-current power supply was connected to the two ITO-film deposited glass plates of the panel-shaped display medium to apply a voltage thereto.

The result was that the display surface showed a remarkable contrast between white color and black color. The reflectance of each of the colors displayed on the display surface was measured in such a manner that incident angle was 45' and the reflected light was received at a position perpendicular to the display surface. The contrast, which was determined from the ratio of the reflectances of the black and white colors was 11.0.

EXAMPLE 5

Fabrication of Display Apparatus

A transparent electroconductive film (ITO film) was formed on one surface of a 3-mm thick transparent glass plate to prepare an insulating substrate. A polyacrylate resin plate (Trademark "EMBLET" made by Unitika, Ltd.) was disposed to face the ITO film side of the glass plate via nylon beads to have an enclosed space with a thickness of about 150 μm therebetween. The above prepared display liquid No. 3 prepared in Example 3 was injected into the space between the glass plate and the polyacrylate resin plate, and those plates were sealed together with an epoxy resin adhesive. Thus, a panel-shaped electrophoretic display medium was obtained.

An ITO-film deposited glass plate was placed on the polyacrylate resin plate, and a direct-current power supply was connected to the two ITO-film deposited glass plates of the panel-shaped display medium to apply a voltage thereto.

The result was that the display surface showed a remarkable contrast between white color and black color. The reflectance of each of the colors displayed on the display surface was measured in such a manner that incident angle was 45° and the reflected light was received at a position perpendicular to the display surface. The contrast, which was determined from the ratio of the reflectances of the black and white colors was 8.0.

EXAMPLE 6

Fabrication of Display Apparatus

A pair of 3-mm thick transparent glass plates, each being coated with a transparent electrode film (ITO film), were disposed via nylon beads to have an enclosed space with a thickness of about 150 $\mu$m therebetween in such a configuration that both electrode films were directed to each other. The electrophoretic display particles (microcapsules) prepared in Example 3 were injected into the space between the glass plates, and the glass plates were sealed together with an epoxy resin adhesive. Thus, a panel-shaped electrophoretic display medium was obtained.

A direct-current power supply was connected to the panel-shaped display medium to apply a voltage thereto.

The result was that the display surface showed a remarkable contrast between white color and black color. The reflectance of each of the colors displayed on the display surface was measured in such a manner that Incident angle was 45° and the reflected light was received at a position perpendicular to the display surface. The contrast, which was determined from the ratio of the reflectances of the black and white colors was 8.1.

EXAMPLE 7

Fabrication of Display Apparatus

The procedure for fabrication of the display apparatus as in Example 3 was repeated except that a 10% aqueous solution of poly(vinyl alcohol) was coated on the recording layer comprising the microcapsules prepared in Example 3 by a wire bar and dried to overlay an overcoat layer with a thickness of about 10 $\mu$m on the recording layer.

Thus, an electrophoretic display apparatus of the present invention was fabricated.

EXAMPLE 8

Fabrication of Display Apparatus

The recording layer comprising the microcapsules was provided on the ITO-film deposited polycarbonate plate in the same manner as in Example 3.

A vinyl chloride-vinyl acetate copolymer was dissolved in a mixed solvent of methyl ethyl ketone and methyl isobutyl ketone (ratio by weight of 9:1) at a concentration of 15 wt. %, and the thus prepared solution was coated on the recording layer by a wire bar, and dried, so that an overcoat layer was further provided on the recording layer.

Furthermore, screen printing was carried out on the overcoat layer using a white ink, whereby a printing layer was provided on the overcoat layer.

Thereafter, screen printing was carried out on the printing layer using an overprinting ink, so that a printing protection layer was further provided on the printing layer.

Thus, an electrophoretic display cell was obtained.

Using the above obtained display cell, an electrophoretic display apparatus of the present invention was fabricated in the same manner as in Example 3.

EXAMPLE 9

Fabrication of Display Apparatus

The same display cell as in Example 3 was prepared.

A solution was prepared by mixing 10 wt. % of $\gamma$-$Fe_2O_3$, 10 wt. % of a vinyl chloride-vinyl acetate-vinyl alcohol copolymer, 1.3 wt. % of polyisocyanate, 40 wt. % of methyl ethyl ketone, and 40 wt. % of toluene. The solution was coated by a wire bar on one of the substrates, and dried, so that a magnetic recording layer with a thickness of 10 $\mu$m was provided on one substrate.

A toluene solution of an acrylic ultraviolet curing resin at a concentration of 70 wt. % was coated on the magnetic recording layer by a wire bar and dried, so that a protective layer with a thickness of 10 $\mu$m was provided on the magnetic recording layer.

An integrated circuit memory built-in film was attached to a part of the protective layer via an adhesive layer.

Thus, an electrophoretic display medium provided with a rewritable information recording portion was fabricated.

Using the above prepared display medium of the present invention, a display apparatus was obtained in the same manner as in Example 3.

COMPARATIVE EXAMPLE 1

Measurement of Electrophoretic Properties of Coloring Powders 1.0 g of oleic acid and 0.1 g of titanium oxide (Trademark "CR50-2", made by Ishihara Sangyo Kaisha, Ltd.) were added to 7.6 g of dodecylbenzene, followed by the application of ultrasonic wave. Thus, a dispersion E was prepared.

A pair of glass plates, each being coated with a transparent electrode film (ITO film), were disposed via spacers to have an enclosed space therebetween in such a configuration that both electrode films were directed to each other. The above prepared dispersion E was injected into the space between the glass plates, and the electrodes were secured with clips to prepare a measuring cell. A direct-current power supply was connected to the measuring cell and a voltage was applied thereto so that the intensity of the applied electric field was 10 kV/cm. Thereafter, the clips were removed and the glass plates were split to observe the condition of the dispersion E at both portions adjacent to the glass plates.

As a result, a white dispersion remained around one of the surface portions, while a colorless dispersion medium was observed around the other surface portion. It was confirmed that the titanium oxide "CR50-2" particles for use in the dispersion E have the property of electrophoretically moving through the dispersion medium in response to the applied electric field with a predetermined intensity.

1.0 g of oleic acid and 0.1 g of Cobalt Chrome Green (made by Toyo Ganryo Kogyo Co., Ltd.) were added to 7.6 g of dodecylbenzene, followed by the application of ultrasonic wave. Thus, a dispersion F was prepared.

A pair of glass plates, each being coated with a transparent electrode film (ITO film), were disposed via spacers to have an enclosed space therebetween in such a configuration that both electrode films were directed to each other. The above prepared dispersion F was injected into the space between the glass plates, and the electrodes were secured with clips to prepare a measuring cell. A direct-current power supply was connected to the measuring cell and a voltage was applied thereto so that the intensity of the applied electric field was 10 kV/cm. Thereafter, the clips were removed and the glass plates were split to observe the condition of the dispersion F at both portions adjacent to the glass plates.

As a result, a green dispersion remained around one of the surface portions, while a colorless dispersion medium was observed around the other surface portion. It was confirmed that the Cobalt Chrome Green particles for use in the dispersion F have the property of electrophoretically moving through the dispersion medium in response to the applied electric field with a predetermined intensity.

Preparation of Display Liquid 1.0 g of oleic acid and 0.1 g of titanium oxide particles (Trademark "CR50-2" made by Ishihara Sangyo Kaisha, Ltd.) were added to 7.6 g of dodecylbenzene, followed by the application of ultrasonic wave. 0.1 g of the Cobalt Chrome Green particles (made by Toyo Ganryo Kogyo Co., Ltd.) was added to the above dispersion, followed by the application of ultrasonic wave. Thus, a comparative electrophoretic display liquid No. 1 was prepared.

Fabrication of Display Apparatus

A pair of 3-mm thick transparent glass plates, each being coated with a transparent electrode film (ITO film), were disposed via nylon beads to have an enclosed space with a thickness of about 150 µm therebetween in such a configuration that both electrode films were directed to each other. The above prepared comparative display liquid No. 1 was injected into the space between the glass plates, and the glass plates were sealed together with an epoxy resin adhesive. Thus, a comparative panel-shaped electrophoretic display medium was obtained.

A direct-current power supply was connected to the comparative display medium to apply a voltage thereto.

The result was that the display surface showed a contrast between white color and green color. The reflectance of each of the colors displayed on the display surface was measured in such a manner that incident angle was 45° and the reflected light was received at a position perpendicular to the display surface. The contrast, which was determined from the ratio of the reflectances of the green and white colors was 3.5.

COMPARATIVE EXAMPLE 2

Preparation of Display Particles

An aqueous solution of gelatin and an aqueous solution of gum arabic were mixed and heated to 50° C. The resultant mixture was adjusted to pH9 by the addition of an aqueous solution of sodium hydroxide.

The comparative electrophoretic display liquid No. 1 prepared in Comparative Example 1 was added to the above mixture of the gelatin solution and the gum arabic solution, and the resultant mixture was stirred and emulsified. The pH value of the mixture was gradually decreased to 4 to precipitate a concentrated solution of gelatin and gum arabic at the interface of the dispersion. Thereafter, the film thus prepared set to gel as the temperature was decreased, and was cured by the addition thereto of an aqueous solution of glutaraldehyde. Thus, there was prepared a slurry of microcapsules of which the shell material was gelatin. The emulsifying conditions were controlled so that the particle size of the obtained microcapsules was about 50 µm. Thus, comparative electrophoretic display particles were obtained.

Fabrication of Display Apparatus 20 g of the above obtained comparative display particles (microcapsules) was added to 80 g of a 10% aqueous solution of poly(vinyl alcohol) to prepare a dispersion. The dispersion was coated on the ITO-film deposited surface of a polycarbonate substrate using an applicator with a gap of 250 µm, and dried, so that a recording layer comprising the microcapsules was provided on the polycarbonate substrate.

A sample niece was cut from the above-mentioned microcapsule-bearing substrate. A glass plate with an ITO film was placed on the recording layer of the sample piece in such a configuration that the ITO film of the glass plate was brought into close contact with the recording layer, and the glass plate and the polycarbonate substrate were fixed with an adhesive tape. Thus, a comparative electrophoretic display medium was prepared.

A direct-current power supply was connected to the comparative display medium to apply a voltage thereto.

The result was that the display surface showed a contrast between white color and green color. The reflectance of each of the colors displayed on the display surface was measured in such a manner that incident angle was 45° and the reflected light was received at a position perpendicular to the display surface. The contrast, which was determined from the ratio of the reflectances of the green and white colors was 3.0.

COMPARATIVE EXAMPLE 3

Preparation of Display Liquid 1 g of dye particles (Trademark "Macrolex Blue RR", made by Bayer A. G.) was dissolved in 100 g of tetrachloroethylene to prepare a solution. 10 g of titanium oxide particles (Trademark "CR50-2", made by Ishihara Sangyo Kaisha, Ltd.) and 5 g of oleic acid were added to the above prepared solution, so that a comparative electrophoretic display liquid No. 2 was prepared.

Fabrication of Display Apparatus

A pair of 3-mm thick transparent glass plates, each being coated with a transparent electrode film (ITO film), were disposed via nylon beads to have an enclosed space with a thickness of about 150 µm therebetween in such a configuration that both electrode films were directed to each other. The above prepared comparative display liquid No. 2 was injected into the space between the glass plates with a syringe, and the glass plates were sealed together with an epoxy resin adhesive. Thus, a panel-shaped comparative electrophoretic display medium was obtained.

A direct-current power supply was connected to the comparative panel-shaped display medium to apply a voltage thereto.

The result was that the display surface showed a contrast between white color and blue color. The reflectance of each of the both white and blue colors was measured in such a manner that incident angle was 45° and the reflected light was received at a position perpendicular to the display surface. The contrast, which was determined from the ratio of the reflectances of the blue and white colors was 2.5.

COMPARATIVE EXAMPLE 4

Preparation of Display Particles

An aqueous solution of gelatin and an aqueous solution of gum arabic were mixed and heated to 50° C. The resultant mixture was adjusted to pH9 by the addition of an aqueous solution of sodium hydroxide.

The comparative display liquid No. 2 prepared in Comparative Example 3 was added to the above mixture of the gelatin solution and the gum arabic solution, and the resultant mixture was stirred and emulsified. The pH value of the mixture was gradually decreased to 4 to precipitate a concentrated solution of gelatin and gum arabic at the interface of the dispersion. Thereafter, the film thus prepared set to gel as the temperature was decreased, and was cured by the addition thereto of an aqueous solution of glutaraldehyde. Thus, there was prepared a slurry of microcapsules of which the shell material was gelatin. The emulsifying conditions were controlled so that the particle size of the obtained microcapsules was about 50 µm. Thus, comparative electrophoretic display particles were obtained.

Fabrication of Display Apparatus 20 g of the above obtained display particles (microcapsules) was added to 80 g of a 10% aqueous solution of poly(vinyl alcohol) to prepare a dispersion. The dispersion was coated on the ITO-film deposited surface of a polycarbonate substrate using an applicator with a gap of 250 µm, and dried, so that a recording layer comprising the microcapsules was provided on the polycarbonate substrate.

A sample piece was cut from the above-mentioned microcapsule-bearing substrate. A glass plate with an ITO film was placed on the recording layer of the sample piece in such a configuration that the ITO film of the glass plate was brought into close contact with the recording layer, and the glass plate and the polycarbonate substrate were fixed with an adhesive tape. Thus, a comparative electrophoretic display medium was prepared.

A direct-current power supply was connected to the comparative display medium to apply a voltage thereto.

The result was that the display surface showed a contrast between white color and blue color. The reflectance of each of both the blue and white colors was measured in such a manner that incident angle was 45° and the reflected light was received at a position perpendicular to the display surface. The contrast, which was determined from the ratio of the reflectances of the blue and white colors was 4.5.

As previously explained, the electrophoretic display method of the present invention employs a display dispersion system comprising a dispersion medium, at least one electrophoretically movable coloring powder, and at least one electrophoretically immovable coloring powder, each of the coloring powders having a different color tone and being dispersed in the dispersion medium. This electrophoretic display method can provide a display with high contrast.

In addition to the above-mentioned electrophoretic display method, the present invention provides an electrophoretic display liquid comprising the above-mentioned display dispersion system. The display liquid of the present invention can achieve a display with high contrast.

Further, there are also provided electrophoretic display particles using the above-mentioned display liquid, an electrophoretic display medium using the display liquid or display particles, an electrophoretic display apparatus, and an electrophoretic reversible display material.

Japanese Patent Application No. 11-301114 filed Oct. 22, 1999 and Japanese Patent Application filed Sep. 11, 2000 are hereby incorporated by reference.

What is claimed is:

1. An electrophoretic display method, using a display dispersion system, said display dispersion system comprising:
   a dispersion medium,
   at least one electrophoretically movable coloring material (A) comprising coloring particles, and
   at least one electrophoretically immovable coloring material (B) comprising coloring particles, each of said coloring materials (A) and (B) having a different color tone and being dispersed in said dispersion medium, comprising the step of:
   selectively causing said coloring material (A) to electrophoretically migrate through said dispersion medium in a predetermined direction in response to an electric field externally applied thereto, while causing said electrophoretically immovable coloring material (B) to stay in said dispersion medium.

2. The display method as claimed in claim 1, wherein said coloring material (A) comprises black particles.

3. The display method as claimed in claim 1, wherein said coloring material (B) comprises white particles.

4. The display method as claimed in claim 1, wherein said coloring material (A) comprises black particles and said coloring material (B) comprises white particles.

5. The display method as claimed in claim 2, wherein said black particles comprise lower titanium oxide particles.

6. The display method as claimed in claim 1, wherein said coloring material (B) comprises hollow polymer particles.

7. An electrophoretic display liquid for use with an electrophoretic display method comprising:
   a dispersion medium,
   at least one electrophoretically movable coloring material (A) comprising coloring particles, and
   at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

8. Electrophoretic display particles comprising microcapsules which contain an electrophoretic display liquid therein, said electrophoretic display liquid comprising:
   a dispersion medium,
   at least one electrophoretically movable coloring material (A) comprising coloring particles, and
   at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

9. An electrophoretic display medium comprising:
   a pair of substrates, at least one of said substrates being transparent and provided with an electrode, said substrates being disposed to face each other via spacers or not to have an enclosed space therebetween in such a configuration that said electrode surface of one substrate faces the other substrate, and
   an electrophoretic display liquid held in said enclosed space between said substrates, comprising:
   (i) a dispersion medium,
   (ii) at least one electrophoretically movable coloring material (A) comprising coloring particles, and
   (iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

10. The display medium as claimed in claim 9, wherein said enclosed space is partitioned by a matrix material which holds said display liquid therein.

11. An electrophoretic display medium comprising:
a pair of substrates, at least one of said substrates being transparent and provided with an electrode, said substrates being disposed to face each other via spacers or not to have an enclosed space therebetween in such a configuration that said electrode surface of one substrate faces the other substrate, and
electrophoretic display particles held in said enclosed space between said substrates, said display particles comprising microcapsules containing an electrophoretic display liquid therein, said display liquid comprising:
  (i) a dispersion medium,
  (ii) at least one electrophoretically movable coloring material (A) comprising coloring particles, and
  (iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

12. The display medium as claimed in claim 11, wherein said enclosed space is partitioned by a matrix material which holds said electrophoretic display particles therein.

13. An electrophoretic display medium comprising:
a substrate having a surface provided with an electrode, and
a recording layer provided on said electrode surface of said substrate, said recording layer comprising a matrix material and an electrophoretic display liquid or display particles comprising microcapsules which contain said electrophoretic display liquid therein, said display liquid comprising:
  (i) a dispersion medium,
  (ii) at least one electrophoretically movable coloring material (A) comprising coloring particles, and
  (iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

14. The display medium as claimed in claim 13, further comprising an overcoat layer which is provided on said recording layer.

15. The display medium as claimed in claim 10, wherein said matrix material comprises at least one resin selected from the group consisting off a thermosetting resin and an activation energy curing resin.

16. The display medium as claimed in claim 12, wherein said matrix material comprises at least one resin selected from the group consisting of a thermosetting resin and an activation energy curing resin.

17. The display medium as claimed in claim 13, wherein said matrix material comprises a resin selected from the group consisting of a thermosetting resin and an activation energy curing resin.

18. The display medium as claimed in claim 14, wherein said matrix material comprises a resin selected from the group consisting of a thermosetting resin and an activation energy curing resin.

19. The display medium as claimed in claim 14, further comprising a printing layer which is provided on at least one portion of said overcoat layer.

20. The display medium as claimed in claim 9, further comprising a printing layer which is provided on at least one portion of said display medium.

21. The display medium as claimed in claim 20, further comprising a printing protection layer which is provided on said printing layer.

22. The display medium as claimed in claim 9, further comprising an information recording portion which is provided on at least one portion of said display medium, said information recording portion being capable of recording information therein and erasing said information therefrom by any other methods than a method of controlling the application of an electric field.

23. The display medium as claimed in claim 22, wherein information is recorded in said information recording portion and erased therefrom by a magnetic action.

24. The display medium as claimed in claim 22, wherein said information recording portion is an integrated circuit memory or an optical memory.

25. The display medium as claimed in claim 22, wherein information is recorded in said information recording portion and erased therefrom by an optical action.

26. The display medium as claimed in claim 22, wherein said information is one for identifying the front or rear side of said display medium and identifying the position of said display medium.

27. An electrophoretic display apparatus comprising an electrophoretic display medium and a recording unit capable of displaying a visible information on said display medium, said recording unit coming in contact with said display medium at least in recording operation,
said recording unit comprising an electrode array which can apply an electric field to said display medium according to image signals and shift the relative position on the same plane with respect to said display medium, and
said display medium comprising (a) a pair of substrates, at least one of said substrates being transparent and provided with an electrode, said substrates being disposed to face each other via spacers or not to have an enclosed space therebetween in such a configuration that said electrode surface of one substrate faces the other substrate, and (b) an electrophoretic display liquid held in said enclosed space between said substrates, said display liquid comprising:
  (i) a dispersion medium,
  (ii) at least one electrophoretically movable coloring material (A) comprising coloring particles, and (iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

28. An electrophoretic display apparatus comprising an electrophoretic display medium and a recording unit capable of displaying a visible information on said display medium, said recording unit being coming in contact with said display medium at least in recording operation, said recording unit comprising an electrode array which can apply an electric field to said display medium according to image signals and shift the relative position on the same plane with respect to said display medium, and said display medium comprising (a) a pair of substrates, at least one of said substrates being transparent and provided with an electrode, said substrates being disposed to face each other via spacers or not to have an enclosed space therebetween in such a configuration that said electrode surface of one substrate faces the other substrate, and (b) electrophoretic display particles held in said enclosed space between said substrates, said display particles comprising microcapsules containing an electrophoretic display liquid therein, said display liquid comprising:

(i) a dispersion medium,
(ii) at least one electrophoretically movable coloring material (A) comprising coloring particles, and
(iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

29. An electrophoretic display apparatus comprising an electrophoretic display medium and a recording unit capable of displaying a visible information on said display medium, said recording unit being coming in contact with said display medium at least in recording operation, said recording unit comprising an electrode array which can apply an electric field to said display medium according to image signals and shift the relative position on the same plane with respect to said display medium, and said display medium comprising (a) a substrate having a surface provided with an electrode, (b) a recording layer provided on said electrode surface of said substrate, said recording layer comprising a matrix material which holds an electrophoretic display liquid or electrophoretic display particles comprising microcapsules which contain said display liquid therein, said display liquid comprising:

(i) a dispersion medium,
(ii) at least one electrophoretically movable coloring material (A) comprising coloring particles, and
(iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

30. An electrophoretic display apparatus comprising an electrophoretic display medium and a recording unit capable of displaying a visible information on said display medium, said recording unit being disposed in proximity to said display medium at least in recording operation, said recording unit comprising an ion beam array which can impart electric charges to said display medium according to image signals and shift the relative position on the same plane with respect to said display medium, and said display medium comprising (a) a pair of substrates, at least one of said substrates being transparent and provided with an electrode, said substrates being disposed to face each ocher via spacers or not to have an enclosed space therebetween in such a configuration that said electrode surface of one substrate faces the other substrate, and (b) an electrophoretic display liquid held in said enclosed space between said substrates, said display liquid comprising:

(i) a dispersion medium,
(ii) at least one electrophoretically movable coloring material (A) comprising coloring particles, and
(iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

31. An electrophoretic display apparatus comprising an electrophoretic display medium and a recording unit capable of displaying a visible information on said display medium, said recording unit being disposed in proximity to said display medium at least in recording operation, said recording unit comprising an ion beam array which can impart electric charges to said display medium according to image signals and shift the relative position on the same plane with respect to said display medium, and said display medium comprising (a) a pair of substrates, at least one of said substrates being transparent and provided with an electrode, said substrates being disposed to face each other via spacers or not to have an enclosed space therebetween in such a configuration that said electrode surface of one substrate faces the other substrate, and (b) electrophoretic display particles held in said enclosed space between said substrates, said display particles comprising microcapsules containing an electrophoretic display liquid therein, said display liquid comprising:

(i) a dispersion medium,
(ii) at least one electrophoretically movable coloring material (A) comprising coloring particles, and (iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

32. An electrophoretic display apparatus comprising an electrophoretic display medium and a recording unit capable of displaying a visible information on said display medium, said recording unit being disposed in proximity to said display medium at least in recording operation, said recording unit comprising an ion beam array which can impart electric charges to said display medium according to image signals and shift the relative position on the same plane with respect to said display medium, and said display medium comprising (a) a substrate having a surface provided with an electrode, (b) a recording layer provided on said electrode surface of said substrate, said recording layer comprising a matrix material and an electrophoretic display liquid or electrophoretic display particles comprising microcapsules which contain said display liquid therein, said display liquid comprising:

(i) a dispersion medium, (ii) at least one electrophoretically movable coloring material (A) comprising coloring particles, and (iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

33. An electrophoretic display apparatus comprising an electrophoretic display medium and a recording unit capable of displaying a visible information on said display medium, said recording unit being coming in contact with said display medium at least in recording operation, said recording unit comprising a plurality of signal electrodes and a plurality or scanning electrodes, each of the intersecting points of said signal electrodes and said scanning electrodes having a switching element capable of applying an electric field to said display medium according to image signals, and said display medium comprising (a) a pair of substrates, at least one of said substrates being transparent and provided with an electrode, said substrates being disposed to face each other via spacers or not to have an enclosed space therebetween in such a configuration that said electrode surface of one substrate faces the other substrate, and (b) an electrophoretic display liquid held in said enclosed space between said substrates, said display liquid comprising:

(i) a dispersion medium, (ii) at least one electrophoretically movable coloring material (A) comprising coloring particles, and (iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

34. An electrophoretic display apparatus comprising an electrophoretic display medium and a recording unit capable of displaying a visible information on said display medium, said recording unit being coming in contact with said display medium at least in recording operation, said recording unit comprising a plurality of signal electrodes and a plurality of scanning electrodes, each of the intersecting points of said signal electrodes and said scanning electrodes having a switching element capable of applying an electric field to said display medium according to image signals, and said display medium comprising (a) a pair of substrates, at least one of said substrates being transparent and provided with an electrode, said substrates being disposed to face each other via spacers or not to have an enclosed space therebetween in such a configuration that said electrode surface of one substrate faces the other substrate, and (b) electrophoretic display particles held in said enclosed space between said substrates, said display particles comprising microcapsules containing an electrophoretic display liquid therein, said display liquid comprising:

(i) a dispersion medium, (ii) at least one electrophoretically movable coloring material (A) comprising coloring particles, and (iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

35. An electrophoretic display apparatus comprising an electrophoretic display medium and a recording unit capable of displaying a visible information on said display medium, said recording unit being coming in contact with said display medium at least in recording operation, said recording unit comprising a plurality of signal electrodes and a plurality of scanning electrodes, each of the intersecting points of said signal electrodes and said scanning electrodes having a switching element capable of applying an electric field to said display medium according to image signals, and said display medium comprising (a) a substrate having a surface provided with an electrode, (b) a recording layer provided on said electrode surface of said substrate, said recording layer comprising a matrix material and an electrophoretic display liquid or electrophoretic display particles comprising microcapsules which contain said display liquid therein, said display liquid comprising:

(i) a dispersion medium, (ii) at least one electrophoretically movable coloring material (A) comprising coloring particles, and (iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

36. The display apparatus as claimed in claim 33, wherein said switching element is a thin-film transistor.

37. The display apparatus as claimed in claim 34, wherein said switching element is a thin-film transistor.

38. The display apparatus as claimed in claim 35, wherein said switching element is a thin-film transistor.

39. A reversible display material comprising an electrophoretic display medium which comprises:
(a) a pair of substrates, at least one of said substrates being transparent and provided with an electrode, said substrates being disposed to face each other via spacers or not to have an enclosed space therebetween in such a configuration that said electrode surface of one substrate faces the other substrate, and
(b) an electrophoretic display liquid held in said enclosed space between said substrates, said display liquid comprising:
  (i) a dispersion medium,
  (ii) at least one electrophoretically movable coloring material (A) comprising coloring particles, and
  (iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

40. A reversible display material comprising an electrophoretic display medium which comprises:
(a) a pair of substrates, at least one of said substrates being transparent and provided with an electrode, said substrates being disposed to face each other via spacers or not to have an enclosed space therebetween in such a configuration that said electrode surface of one substrate faces the other substrate, and
(b) electrophoretic display particles held in said enclosed space between said substrates, said display particles comprising microcapsules containing an electrophoretic display liquid therein, said display liquid comprising:
  (i) a dispersion medium,
  (ii) at least one electrophoretically movable coloring material (A) comprising coloring particles, and
  (iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

41. A reversible display material comprising an electrophoretic display medium which comprises:
(a) a substrate having a surface provided with an electrode, and
(b) a recording layer provided on said electrode surface of said substrate, said recording layer comprising a matrix material and an electrophoretic display liquid or electrophoretic display particles comprising microcapsules which contain said display liquid therein, said display liquid comprising:
  (i) a dispersion medium,
  (ii) at least one electrophoretically movable coloring material (A) comprising coloring particles, and
  (iii) at least one electrophoretically immovable coloring material (B) comprising coloring particles, each of said coloring materials (A) and (B) having a different color tone and being dispersed in said dispersion medium, said coloring material (A) being selectively caused to electrophoretically migrate through said dispersion medium in a predetermined direction in response to an electric field externally applied thereto, while said electrophoretically immovable coloring material (B) being caused to stay in said dispersion medium.

42. The reversible display material as claimed in claim 39, prepared in the form of a reversible display card, a reversible recording sheet, a reversible display panel, or a reversible display signboard.

43. The reversible display material as claimed in claim 42, wherein said reversible display card, said reversible recording sheet, said reversible display panel, or said reversible display signboard has flexibility.

* * * * *